US006965717B1

(12) United States Patent
Tabuchi

(10) Patent No.: US 6,965,717 B1
(45) Date of Patent: Nov. 15, 2005

(54) OPTICAL DEVICE, POLARIZATION MONITOR AND OPTICAL SWITCH

(75) Inventor: Haruhiko Tabuchi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 11/079,442

(22) Filed: Mar. 15, 2005

(30) Foreign Application Priority Data

Oct. 19, 2004 (JP) ............................. 2004-304791

(51) Int. Cl.[7] ............................. G02B 6/00; G02B 6/34
(52) U.S. Cl. ..................... 385/37; 385/147; 359/565
(58) Field of Search ............................. 385/16, 31, 37, 385/39–41, 147, 2–3, 8; 359/3, 5, 7, 15, 565; 356/356, 363, 401; 250/491.1, 491.2

(56) References Cited

U.S. PATENT DOCUMENTS

| | | | | |
|---|---|---|---|---|
| 6,370,284 | B1 * | 4/2002 | Shekel et al. ................... | 385/4 |
| 6,374,002 | B1 * | 4/2002 | Shekel et al. ................... | 385/8 |
| 6,556,730 | B2 * | 4/2003 | Shekel et al. ................... | 385/8 |
| 6,684,001 | B2 * | 1/2004 | Shekel et al. ................... | 385/8 |
| 2002/0150318 | A1 * | 10/2002 | Shekel et al. ................... | 385/8 |
| 2003/0021511 | A1 * | 1/2003 | Shekel et al. ................... | 385/8 |

FOREIGN PATENT DOCUMENTS

JP 2003-107261 4/2003

OTHER PUBLICATIONS

T. Shimoda et al., "Low Temperature Process of Silica Waveguides by TEOS-$O_3$ Atmospheric Pressure CVD", The General Conference, 1996, The Institute of Electronics, Information and Communication Engineers, 1996, p. 230.
T. Hanada, et al., "Polarization Independent Arrayed-Waveguide Grating Based on Silica Waveguide", The Electronics Society Conference, 1999, The Institute of Electronics, Information and Communication Engineers, 1999, p. 222.
T. Hanada, et al., "FDM/WDM Couplers Using Silica Waveguide Deposited By APCVD", IEICE Trans., Electron. vol. E80-C, No. 1, Jan. 1997, pp. 130-133.

* cited by examiner

Primary Examiner—Akm Enayet Ullah
(74) Attorney, Agent, or Firm—Staas & Halsey LLP

(57) ABSTRACT

The present invention has for its object to provide an optical device whose size is made small. In order to achieve this, according to the present invention there is provided an optical device in which a clad and a core whose refractive index is relatively higher than that of the clad are formed on a substrate and light can be transmitted through the core, wherein the core is provided with an input light transmitting pattern section, a diffraction pattern section, and a phase difference generating pattern section. Further, at least in the phase difference generating pattern section, a part, where refractive indexes are different respectively in the direction parallel to the substrate and in the direction perpendicular to the substrate, is provided.

18 Claims, 27 Drawing Sheets

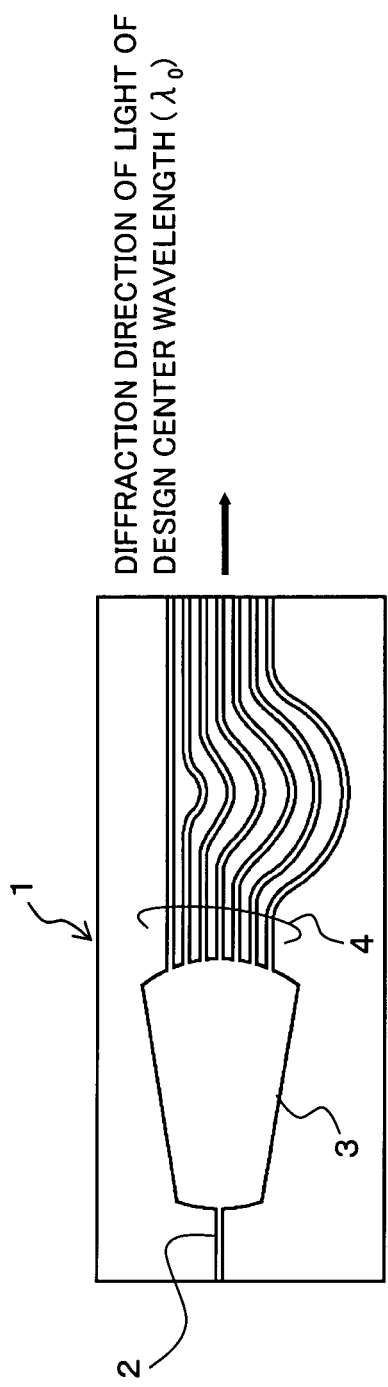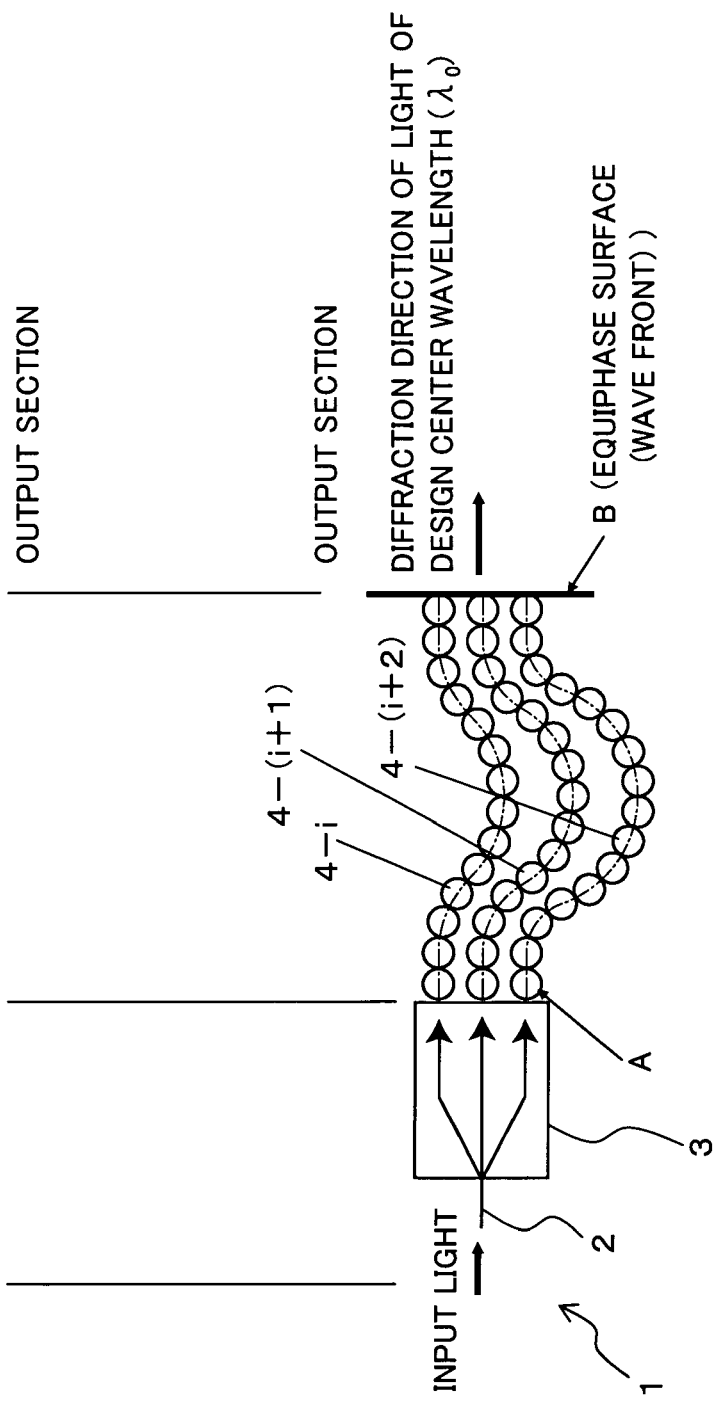

FIG. 16

| PARAMETER | SIGN | VALUE | UNIT | EXAMPLE OF VALUE |
|---|---|---|---|---|
| DIFFRACTION ORDER | m | 38 | | |
| GRATING PITCH | d | 10 | μm | |
| FOCAL DISTANCE OF LENS | f2 | 41 | mm | |
| SPOT SIZE | ω2 | 20 | μm | |
| FOCAL DISTANCE OF LENS | f1 | SELECT SO THAT SPOT SIZE ω2 BECOMES μm | | 7.7 mm |
| SPOT SIZE | ω1 | | | 2.5 μm |
| THE NUMBER OF WAVEGUIDES | N | SELECT SO THAT NON-ADJACENT CROSSTALK BECOMES ≤−30dB | | 308 PIECES |

OPTICAL DEVICE, POLARIZATION MONITOR AND OPTICAL SWITCH

CROSS REFERENCE TO RELATED APPLICATIONS

This application is based on and hereby claims priority to Japanese Application No. 2004-304791 filed on Oct. 19, 2004 in Japan, the contents of which are hereby incorporated by reference.

BACKGROUND OF THE INVENTION

1) Field of the Invention

The present invention relates to an optical device, adapted to be used when light is split into two orthogonal polarized light components contained therein, more particularly, adapted to be suitably used when light including a plurality of wavelengths is split into polarized light, and also relates to a polarization monitor and an optical switch.

2) Description of the Related Art

Conventionally, when polarized light of wavelength multiplexed (WDM: wavelength division multiplexing) light, is monitored, the light is split into each wavelength and thereafter its polarized light components are split by a polarizer, whereupon the polarized light is monitored. The polarizer is an element that splits and selects linearly polarized component of light from light having various polarizations.

As the polarizer, there can be enumerated e.g. a single image type polarizing prism, a double image type polarizing prism, and a birefringent plate, a polarized light beam splitter which utilize the Brewster's condition of multilayered dielectric thin films.

The single image type polarizing prism transmits only a component of orthogonal polarization, as Glan-Thompson prism or Nicol prism does. On the other hand, the double image type polarizing prism separate components of orthogonal polarization and output the separated components of orthogonal polarization, as Wallaston prism or Rochon Prism does.

The conventional polarizer is described in the literature "Optical Application Electronics Handbook", first print of first edition written by Optical Application Electronics Handbook Editing Committee, 1989, published by SHOKODO Co., Ltd. and the literature "Optics" written by K. Ishiguro, 1977, published by KYORITSU SHUPPAN Co., Ltd.

When the polarized light of wavelength-multiplexed light is monitored, among the mentioned-above polarizers, the single image prism, the plural image prism, the birefringent plate, and multilayered dielectric thin film type polarized light beam splitter have been used.

FIGS. 31 and 32 are diagrams showing a conventional polarization monitor described in the Patent Document 1 mentioning below. At the polarization monitor described in the Patent Literature 1, a plane waveguide circuit is used, and after wavelength multiplexed light is de-multiplexed into for each wavelength, devices, which monitor the polarized light component for each wavelength, are integrated on one substrate.

Here, FIG. 31 is a block diagram showing a total structure of the polarization monitor, and a polarization monitor 201 shown in FIG. 31 has a structure that is provided with a wavelength de-multiplexing filter 210, polarized light dependent optical circuits 220a to 220d, and photoelectric conversion element arrays 230a to 230d. The wavelength de-multiplexing filter 210 de-multiplexes input light inputted from an input port 200 into each wavelength, and outputs the de-multiplexed input light as respective wavelength de-multiplexed light 202a to 202d to each of the polarized light dependent optical circuits 220a to 220d.

And each of the polarized light dependent optical circuits 220a to 220d has a common structure as shown in the reference numeral 220 of FIG. 32, and also each of the photoelectric conversion element arrays 230a to 230d has a common structure as shown in the reference numeral 230 of FIG. 32. And as shown in FIGS. 31 and 32, by one to one relation between the polarized light dependent optical circuit 220 (220a to 220d) and the photoelectric conversion element array 230 (230a to 230d), a polarized state of an optical signal 202 (the reference numerals 202a to 202d in FIG. 31) of each wavelength de-multiplexed at the wavelength de-multiplexing filter 210 can be monitored.

Here, the polarized light dependent optical circuit 220 extracts four lights for measuring the polarized state of the optical signal 202 to which the wavelength de-multiplexing was applied at the wavelength de-multiplexing filter 210, and has a structure that is provided with beam splitters 203-1 to 203-3, polarizers 204-1 to 204-4, and mirrors 207-1 to 207-3. And the photoelectric conversion element array 230 has a structure that is provided with four photoelectric conversion elements 205-1 to 205-4 that receive four lights extracted at the polarized light dependent optical circuit 220 and outputs an electric signal corresponding to each of the intensity of the received light.

Actually, at each of the photoelectric conversion elements 205-1 to 205-3, output light from each of the polarizers 204-1 to 204-3 is inputted via each of the mirrors 207-1 to 207-3, and an electric signal corresponding to the intensity of the output light from each of the polarizers 204-1 to 204-3 is outputted. And at the photoelectric conversion elements 205-4, output light from the polarizers 204-4 is inputted, and an electric signal corresponding to the intensity of the output light from the polarizers 204-4 is outputted.

Therefore, at the technology described in the above-mentioned Patent Document 1, when the polarized state of light to be measured, in which a plurality of light is multiplexed, is measure, the polarized state of each wavelength is measured, after the light to be measured was split into each wavelength by the wavelength de-multiplexing filter.

[Patent Document 1] Japanese Patent Laid-Open (Kokai) 2003-107261

However, at the technology described in the above-mentioned Patent Document 1, in order to measure the polarized state of light in which a plurality of light is multiplexed, many polarized light splitting elements corresponding to the multiplexing number of light are required, with the result that there is a problem that the size of the polarization monitor becomes large.

And also there is a problem that the number thereof increases the cost of the polarized light splitting elements.

Moreover, there is a problem that the time and labor for adjusting the disposing positions of the polarized light splitting elements and manufacturing thereof are increased by the number of polarized light splitting elements.

Further, the de-multiplexing of wavelengths and the splitting of polarized light are executed separately, so that, there is a problem that the loss of light is increased.

SUMMARY OF THE INVENTION

It is therefore an object of the present invention to provide an optical device, a polarization monitor and an optical switch, in which the size can be made small.

And also, another object of the present invention is to provide an optical device, a polarization monitor and an optical switch, in which the increase of the cost of components thereof can be restrained by reducing the number of components from the conventional deice.

Moreover, an additional object of the present invention is to provide an optical device, a polarization monitor and an optical switch, in which assembling thereof can be executed easily.

Furthermore, a further additional object of the present invention is to provide an optical device, a polarization monitor and an optical switch, in which the increase of the loss of light can be restrained by executing the wavelength de-multiplexing and the polarized light splitting at the same time.

For achieving the above-mentioned object, according to the present invention there is provided an optical device, in which a clad and a core whose refractive index is relatively higher than that of the clad are formed on a substrate and light is guided in the core. And the core comprises an input pattern section, including an exposing section in which a core pattern cross section is exposed at one end of the optical device, that is provided with a pattern in which light inputted from the exposing section is able to be transmitted, a diffraction pattern section that is formed to connect to the input light transmitting pattern section and has a pattern in which the light from the input pattern section is able to be freely diffracted and becomes divergent, and a phase shifting pattern section that is comprised of a plurality of waveguide patterns in which effective optical path lengths are formed different from each other, wherein one end of the a plurality of waveguide patterns are connected to the diffraction pattern section, and the phase shifting pattern section including output end on the other end side opposite to the diffraction pattern section, and the phase shifting pattern section is able to generate phase difference for the light from the diffraction pattern section and output diffracted light beam via the output end, wherein at least the phase shifting pattern section comprises a birefringent part where the refractive indexes of light, having a vibration plane of electric field vector parallel to a main plane of the substrate, are different from the refractive indexes of light, having a vibration plane of electric field vector perpendicular to the main plane, wherein a boundary section between the side of the phase shift pattern section and the diffraction pattern section is arc shaped, and an effective path length difference of the waveguide patterns adjacent to each other is a constant.

And end side of said a plurality of waveguide patterns corresponding to said output end is formed to line in a straight line.

Here case, preferably, a region of a predetermined length patterns including said output end in said a plurality of waveguide patterns is configured as a parallel region whose pitch is a constant and is lined in parallel.

Furthermore, the optical device preferably comprises an output core pattern section that is connected to said parallel region of said phase shifting pattern section, and is formed to have a width wider than the width of said parallel region such that said a plurality of waveguide patterns of which said phase difference generating pattern section is comprised are connected in unification, at one side edge section of said optical device.

And the birefringent part is configured to output each two orthogonally polarized components of a monochromatic light beam via said output end at two different diffraction angles when a plurality of monochromatic light beams having different wavelength are inputted.

In this case, difference of said diffraction angles between said two orthogonally polarized components of a monochromatic light beam is smaller than the difference of said diffraction angles between same polarized components of two monochromatic light beams having the smallest wavelength difference.

Furthermore, difference of said diffraction angles between said two orthogonally polarized components of a monochromatic light beam is approximately a half of the difference of said diffraction angles between same polarized components of two monochromatic light beams having the smallest wavelength difference.

And also, the birefringent part includes at least all of said phase difference generating pattern section.

And a polarization monitor of the present invention comprises an optical device, in which a clad and a core whose refractive index is relatively higher than that of said clad are formed on a substrate and light is guided in said core to be able to propagate through said core, wherein said core, comprising an input pattern section, including an exposing section in which a core pattern cross section is exposed at one end of said optical device, that is provided with a pattern in which light inputted from said exposing section is able to be transmitted; a diffraction pattern section that is formed to connect to said input light transmitting pattern section and has a pattern in which said light from said input pattern section is able to be freely diffracted and becomes divergent; and a phase shifting pattern section that is comprised of a plurality of waveguide patterns in which effective optical path lengths are formed different from each other, wherein one end of said a plurality of waveguide patterns are connected to said diffraction pattern section, and said phase shifting pattern section including output end on the other end side opposite to said diffraction pattern section, and said phase shifting pattern section is able to generate phase difference for said light from said diffraction pattern section and output diffracted light beam via said output end, wherein at least said phase shifting pattern section comprises a birefringent part where the refractive indexes of light, having a vibration plane of electric field vector parallel to a main plane of said substrate, are different from the refractive indexes of light, having a vibration plane of electric field vector perpendicular to the main plane, wherein a boundary section between the side of said phase shift pattern section and said diffraction pattern section is arc shaped, and an effective path length difference of said waveguide patterns adjacent to each other is a constant; an optical system for splitting light beams outputted from said optical device into a plurality of light beams in accordance with output angles of said light beams, and focusing each said split light beam at a plurality of focal points different from each other corresponding to said each split light beam; and a photoelectric conversion section of an array shape disposed near said a plurality of focal points of said optical system.

Furthermore, the optical system comprises a cylindrical lens that collimates the light outputted from said output end of said optical device and diffused to the direction perpendicular to the main plane, and a focusing lens that focuses the light transmitted through said cylindrical lens.

And also, an end of said waveguide patterns is connected to said diffraction pattern section at one end, and also the other end is formed to line in a straight line as an output end.

Furthermore, a region of a predetermined length patterns including said output end in said a plurality of waveguide patterns is configured as a parallel region whose pitch is a constant and is lined in parallel.

And the polarization monitor can further comprise an output core pattern section that is connected to said parallel region of said phase shifting pattern section, and is formed to have a width wider than the width of said parallel region such that said a plurality of waveguide patterns of which said phase difference generating pattern section is comprised are connected in unification, at one side edge section of said optical device.

And also, the refractive index difference generating structure is configured such that diffraction angle difference by which light of the two polarized light components for each wavelength becomes smaller than diffraction angle difference between the diffraction angles of adjacent channel light in wavelength multiplexed light.

Furthermore, the angle difference by which said light of two polarized light components being orthogonal for each wavelength is approximately a half of angle difference by which light of said constant frequency interval is diffracted.

And a polarization monitor of the present invention comprises an optical splitter that is able to split inputted WDM light into first to third split light; a first analyzer that is able to detect a polarized light component of said first split light; a first optical monitor that is able to monitor light for each wavelength component of an output from said first analyzer; a quarter wavelength plate disposed on an optical path of said second split light; a second analyzer that is able to detect a polarized light component of an output from said quarter wavelength plate; a second optical monitor that is able to monitor light for each wavelength component of an output from said second analyzer; a polarization monitor section that has the structure described above and is able to monitor two polarized light components being orthogonal of each wavelength component of said third split light; and an operating section that operates a polarization state for each wavelength component from the monitored result at said first and second optical monitors and the monitored result at said polarization monitor.

Furthermore, the operating section operates Stokes parameter which describes said polarization state.

And an optical switch of the present invention, in which a plurality of optical devices are vertically disposed in parallel, and each of said optical devices is an optical device, in which a clad and a core whose refractive index is relatively higher than that of said clad are formed on a substrate and light is able to be transmitted through said core, and said core comprises an exposing section in which a core pattern cross section is exposed at one end of said optical device, and an input and output light transmitting pattern section that is provided with a pattern in which light inputted and outputted from said exposing section is able to be transmitted, a diffraction pattern section that is formed to connect to said input and output light transmitting pattern section and has a pattern in which said light from said input light transmitting pattern section is able to be freely transmitted by being diffracted and being expanded, and a phase difference generating pattern section that is comprised of a plurality of waveguide patterns in which effective optical path lengths are all different from each other, and is able to generate phase difference for said light from said diffraction pattern section by said a plurality of waveguide patterns, and further comprises a refractive index difference generating structure in which the refractive indexes of light, having a vibration plane of electric field vector parallel to a main plane of said substrate, are different from the refractive indexes of light, having a vibration plane of electric field vector perpendicular to the main plane; wherein in said light outputted from said output end of said phase difference generating pattern section, light of a constant frequency interval is able to be diffracted in an approximately constant angle difference by the phase difference generated by said a plurality of waveguide patterns, and also light of two polarized light components being orthogonal for each wavelength is able to be diffracted by said birefringent part whose refractive indexes of light is different in different angles from each other, and comprises a reflection section that reflects light of two polarized light components being orthogonal for each wavelength and whose constant frequency interval is diffracted by a constant angle difference, outputted from said output end of said phase difference generating pattern section at said first and second optical devices as light diffracted in different angle each other, a plurality of cylindrical lenses that make light outputted from said output end of said phase difference generating pattern section in said a plurality of optical devices approximately parallel, and that collimate the light outputted from said output end and diffused to the direction perpendicular to the main plane, respectively, and a condenser lens, disposed between said a plurality of cylindrical lenses, that optically couples said first and second cylindrical lenses with said reflection section.

As mentioned above, according to the optical device of the present invention, the core comprises the input light transmitting pattern section, the diffraction pattern section, and the phase difference generating pattern section, and at least in the phase difference generating pattern section, a part, where the refractive indexes of light transmitting through the core are different from each other in the direction parallel to the substrate and in the direction perpendicular to the substrate, is provided, so that there are attained advantages that the wavelength de-multiplexing function and the polarized light splitting function are realized by one component, enabling to make the optical device smaller than a conventional optical device.

And according to the optical device of the present invention, by providing the part where the refractive indexes of light transmitting through the core are different from each other, an effect that the cost for manufacturing the device to realize the wavelength de-multiplexing function and the polarized light splitting function can be reduced, can be obtained.

Furthermore, by providing the part where the refractive indexes of light transmitting through the core are different from each other, the wavelength de-multiplexing function and the polarized light splitting function are realized by one component, whereby the loss can be reduced as compared with the case of the conventional technology.

And according to the polarization monitor of the present invention, the optical device having the refractive index difference generating structure is provided as a structural element, so that, there is an advantage that the polarized light extinction ratio can be measured in the plurality of wavelengths at the same time.

And also, according to the polarization monitor of the present invention, the optical device having the refractive index difference generating structure is provided as a structural element, so that, not only the wavelength de-multiplexing and the polarized light splitting are executed by one component, but also the photoelectric conversion can be applied to the power of light, to which the wavelength de-multiplexing and the polarized light splitting were applied, by one photoelectric conversion device, so that, as a structure, which monitors the power of light which has been wavelength de-multiplexed and split in terms of the polarized light, there is attained an advantage that a simpler and smaller structure than a conventional structure can be used.

Furthermore, since the alignment between the device executing the wavelength de-multiplexing and the polarized light splitting and the photoelectric conversion section having an array shape can be carried out at one time, there is attained an effect that the manufacturing labor and hour can be reduced.

And according to the polarization monitor of the present invention, the first and second light monitor sections and the polarization monitor section are provided, so that, there is an advantage that can calculate the polarized wave state of each of the wavelength components of the WDM light inputted as the input light, that is, can calculate the vector components on the Poincare sphere, by a simplified structure compared with the conventional device.

Furthermore, according to the polarization monitor of the present invention, the first and second light monitor sections are provided, so that, a wavelength selecting switch, which can switch the route of the WDM light, to which the double multiplexing of the wavelength multiplexing and polarized wave multiplexing have been applied, for each polarized wave of a pertinent wavelength and for each wavelength, can be realized by a simple structure.

BRIEF DESCRIPTION OF THE DRAWINGS

FIGS. 7(*a*) and 7(*b*) are diagrams for explaining that the optical device according to the first embodiment works as a spectral filter;

DESCRIPTION OF THE PREFERRED EMBODIMENTS

Figure 1:
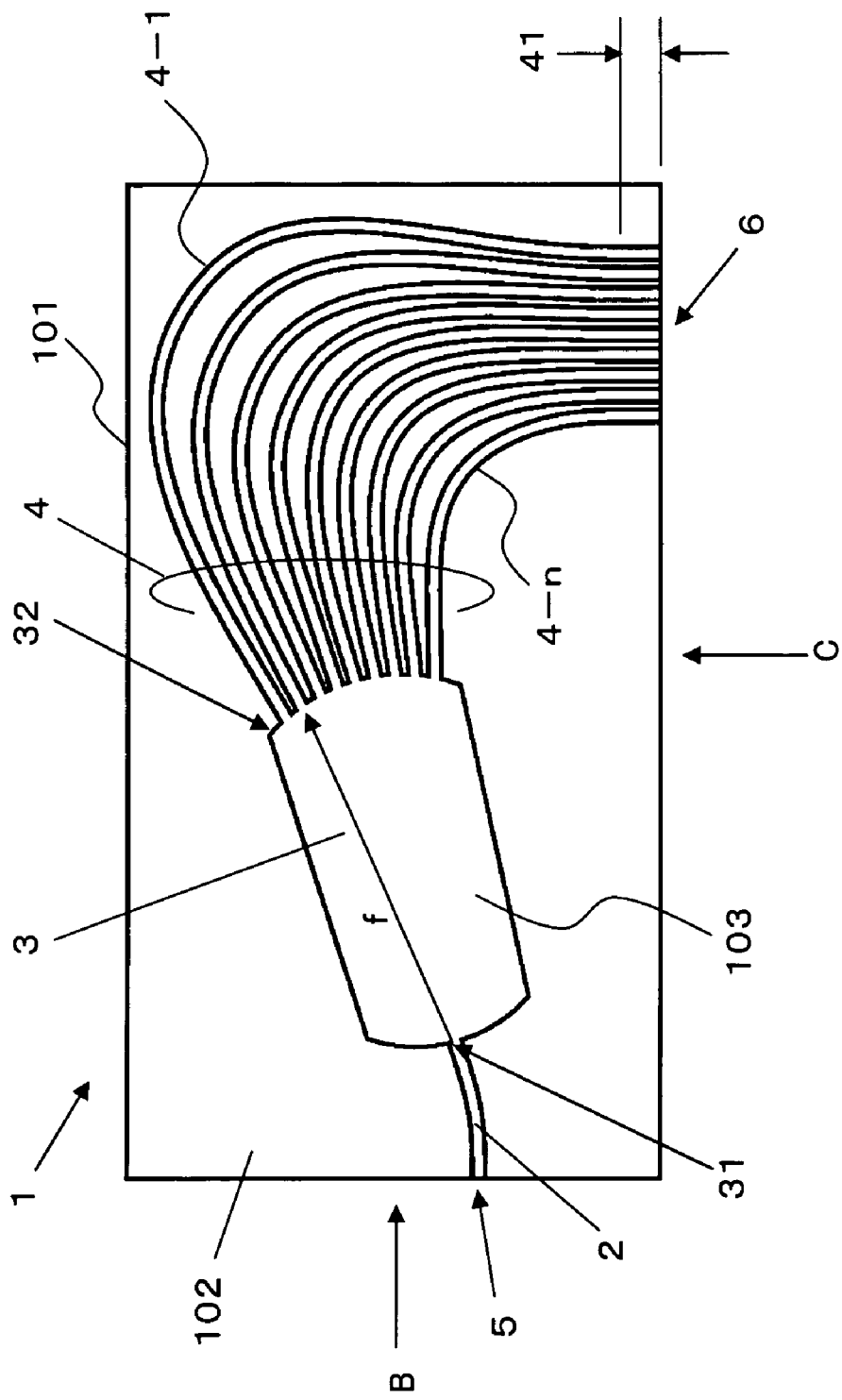
FIGS. 1 to 3 are diagrams showing an optical device according to a first embodiment of the present invention.

Referring now to the drawings, embodiments of the present invention are explained.

In this, in addition to the above-mentioned objects of the present invention, other technical problems, means for solving the other technical problems, and effects thereof will be clear by the disclosure of the following embodiments.

[A1] Explanation of First Embodiment

[A1-1] Structure

Figure 2:
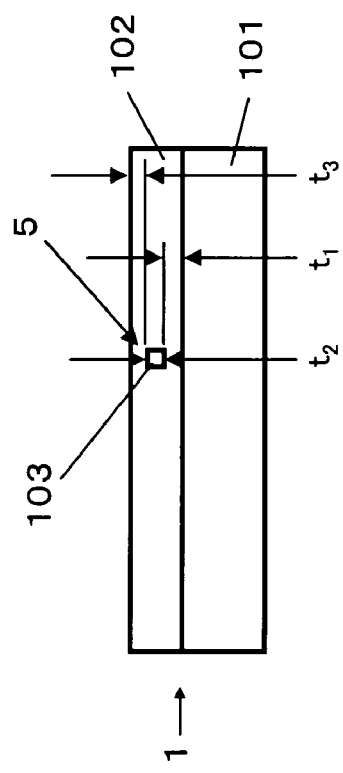
Figure 3:
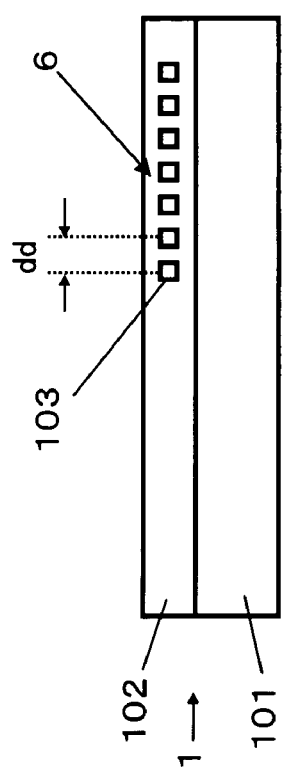

FIGS. 1 to 3 are diagrams showing an optical device 1 according to a first embodiment of the present invention. FIG. 1 is a plane view thereof, FIG. 2 is a sectional view thereof seen toward the arrow B shown in FIG. 1, and FIG. 3 is a sectional view thereof seen toward the arrow C shown in FIG. 1. The optical device 1 according to the first embodiment has both functions as a wavelength spectral device and a polarized light splitting device, which can directly split WDM light into polarized light components (TM polarized light and TE polarized light being orthogonal with each other) each wavelength component.

Herein, the optical device 1 shown in FIGS. 1 to 3 is provided with a plane shape substrate 101 being flat such as a silicon substrate (hereinafter, simply referred to as a substrate), and also is formed by the fact that a core 103, whose refractive index is relatively high, formed continuously in the parallel direction of the surface of the substrate 101 and a clad 102, whose refractive index is relatively low, formed surrounding the core 103, are formed on the substrate 101. That is, this optical device 1 confines light in the core 103 by the total reflection of light generated at the boundary between the core 103 and the clad 102 surrounding the core 103, and is formed as a plane optical waveguide circuit that can transmit light along a pattern formed in the core 103. Here, in FIG. 1, continuous lines show the pattern formed in the core 103.

And as the clad 102, a product of silica glass, in which for example, P (phosphorous) and Ge (germanium) are contained as impurities, can be used, and the core 103, a product of silica glass, in which for example, P (phosphorous) and Ge (germanium) are contained as impurities, can be used. Further, at the optical device 1 according to the first embodiment, the refractive indexes of the clad 102 and the core 103 are selected such that the specific refractive index difference $\Delta$ defined by the following equation (1) becomes approximately 1.5%. Here, the thickness of the substrate 101, can be, for example, approximately 1 mm.

$$\Delta = \frac{\text{(refractive index of core)} - \text{(refractive index of clad)}}{\text{refractive index of core}} \times 100(\%) \quad (1)$$

Here, the core 103 of the optical device 1, as shown in FIG. 1, is comprised of an input pattern section 2, a diffraction pattern section 3, and a phase difference generating pattern section 4. The input pattern section 2 is provided with, as shown in FIG. 2, an exposing section 5 on which a core pattern cross section is exposed at one end of the optical device 1, as well as a pattern that can transmit inputted light, with the exposing section 5 being used as a light input end, to the diffraction pattern section 3 disposed at the post-stage. However, the input pattern section 2 functions as output port with respect to a light from the diffraction pattern section 3. This input pattern section 2 can be, for example, formed by an optical waveguide pattern.

Here, the height and the width of the core of the above-mentioned input pattern section 2, are selected to lead to a single mode waveguide at the wavelength being 1.5 $\mu$m or more. Actually, the height of the core can be approximately 4.2 $\mu$m and also the width of the core can be approximately 4.2 $\mu$m. And in FIG. 2, the height of the clad 102 from the substrate 101 to the bottom of the core 103 on which the exposing section 5 is formed is described as "t1", the height of the core 103 in which the exposing section 5 is formed is described as "t2", and the height from the upper part of the exposing section 5 to the upper surface of the clad 102 is described as "t3".

And the diffraction pattern section 3, (at the opposite side of the input and output end 5 of the input pattern section 2), is formed to connect to the input pattern section 2, and is formed as a diffraction pattern section in which light from the input pattern section 2 can be transmitted freely in such a manner that the light is diffracted and expanded. That is, the diffraction pattern section 3 has a width in which light form the input pattern section 2 can be transmitted freely by being expanded and being diffracted in the direction parallel to the substrate 101 without receiving any restriction. And a connecting section 32 being the end at the opposite side of the input pattern section 2 has an arc shape described as that a connecting section 31, which connects the input pattern section 2 to the diffraction pattern section 3, is made the center.

Actually, the thickness of the diffraction pattern section 3 is, for example, approximately 4.2 $\mu$m, and the length of the diffraction pattern section 3 (the length of the part described as "f" in FIG. 1) is approximately 7.878 mm, and the length (the width) of the diffraction pattern section 3 in the direction perpendicular to the slab length "f" is approximately 3.5 mm. And the one end 32 (boundary) of the diffraction pattern section 3 is an arc of the radius "f" as that the connecting section 31 of the input pattern section 2 and the diffraction pattern section 3 is its center.

Further, the phase difference generating pattern section 4 is comprised of a plurality of waveguide pattern sections 4-1 to 4-n (n: plural) in which effective optical path lengths are all different from each other, and with respect to light from the diffraction pattern section 3, by the above-mentioned waveguide pattern sections 4-1 to 4-n, can generate phase difference among light being transmitted through the respective waveguide pattern sections 4-1 to 4-n.

Actually, at the plural waveguide pattern sections 4-1 to 4-n of the phase difference generating pattern section 4, respective one end thereof is connected to the end 32 (the connecting section 32) of the diffraction pattern section 3, and the cross section of the other end being an output end 6 is formed in such a manner that the cross section of the output end 6 forms a line along a straight line. And at the effective optical path lengths of the above-mentioned plural waveguide pattern sections 4-1 to 4-n, the effective optical path length difference between adjacent two of the waveguide pattern sections 4-1 to 4-n is a constant, and a region 41 including the output end 6 having the length of a constant or more is formed as a parallel region in which a pitch (refer to "dd" in FIG. 3) between adjacent two of the waveguide pattern sections 4-1 to 4-n is a constant and the waveguide pattern sections 4-1 to 4-n are disposed in parallel.

Here, it is not clearly described in FIG. 1, however, these waveguide pattern sections 4-1 to 4-n can provide a taper shape region in which the width thereof is gradually widened in front of the output end 6. And a region from this taper shape region in front of the output end 6 to the output end 6 can be a partial parallel region 41 similar to the above-mentioned parallel region 41.

And also, the height and the width of the core of the above-mentioned phase difference generating pattern section 4, similar to the input pattern section 2, are selected to lead to a single mode waveguide at the wavelength being 1.5 $\mu$m or more. Actually, the height of the core can be approximately 4.2 $\mu$m and also the width of the core can be approximately 4.2 $\mu$m.

Further, the optical device 1 according to the first embodiment is provided with a refractive index difference generating structure in which the refractive index of light transmitting through the core 103 generates the refractive index difference between the direction parallel to the substrate 101 and the direction perpendicular to the substrate 101. That is, in the optical device 1 being composed of the substrate 101, the core 103, and the clad 102, the substrate 101, the core 103, or the clad 102 is configured such that the difference between the refractive index in the direction parallel to the substrate 101 and the refractive index in the direction perpendicular to the substrate 101 occurs.

Figure 4:
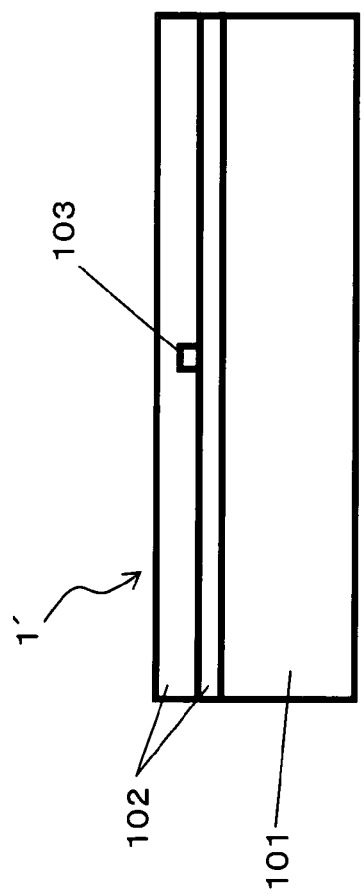
FIGS. 4 and 5 are diagrams for explaining a main part of the optical device according to the first embodiment.
Figure 5:
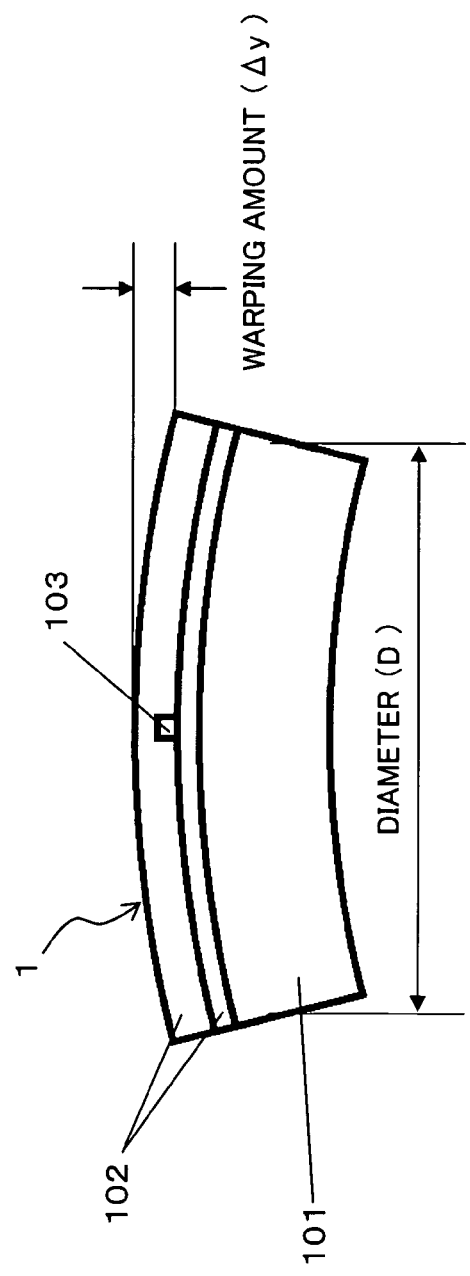

For example, as shown in FIGS. 4 and 5, by utilizing the difference of the linear expansion coefficients between the substrate 101 and the clad 102, a stress is applied only in the direction parallel to the substrate 101 of the optical device 1, and the difference of the refractive indexes between the direction parallel to the substrate 101 and the direction perpendicular to the substrate 101 is generated.

Actually, as exemplified in FIG. 4, heat treatment at a relatively high temperature (800° C. to 1100° C.) is applied to a device 1' being a wafer in which the clad 102 and the core 103 have been deposited on the substrate 101. At this time, the lengths of the substrate 101, the clad 102, and the core 103 are balanced. And in order to make the linear expansion coefficient of the clad 102 smaller than that of the substrate 101, the amount of impurities to be mixed in the clad 102, actually, the amount (wt %) of P (phosphorous) and Ge (germanium) to be mixed, is adjusted.

And when the device 1' having been subjected to the above-mentioned heat treatment is cooled to the room temperature, as shown in the optical device 1 exemplified in FIG. 5, the optical device 1 is curved by the warping amount $\Delta y$, and a compressive stress is applied to the clad 102, only in the direction parallel to the substrate 101, and the refractive index in the direction only parallel to the substrate 101 is changed. Here, with respect to the optical device 1 shown in FIGS. 2 and 3, the above-mentioned curved drawings are omitted.

Figure 6:
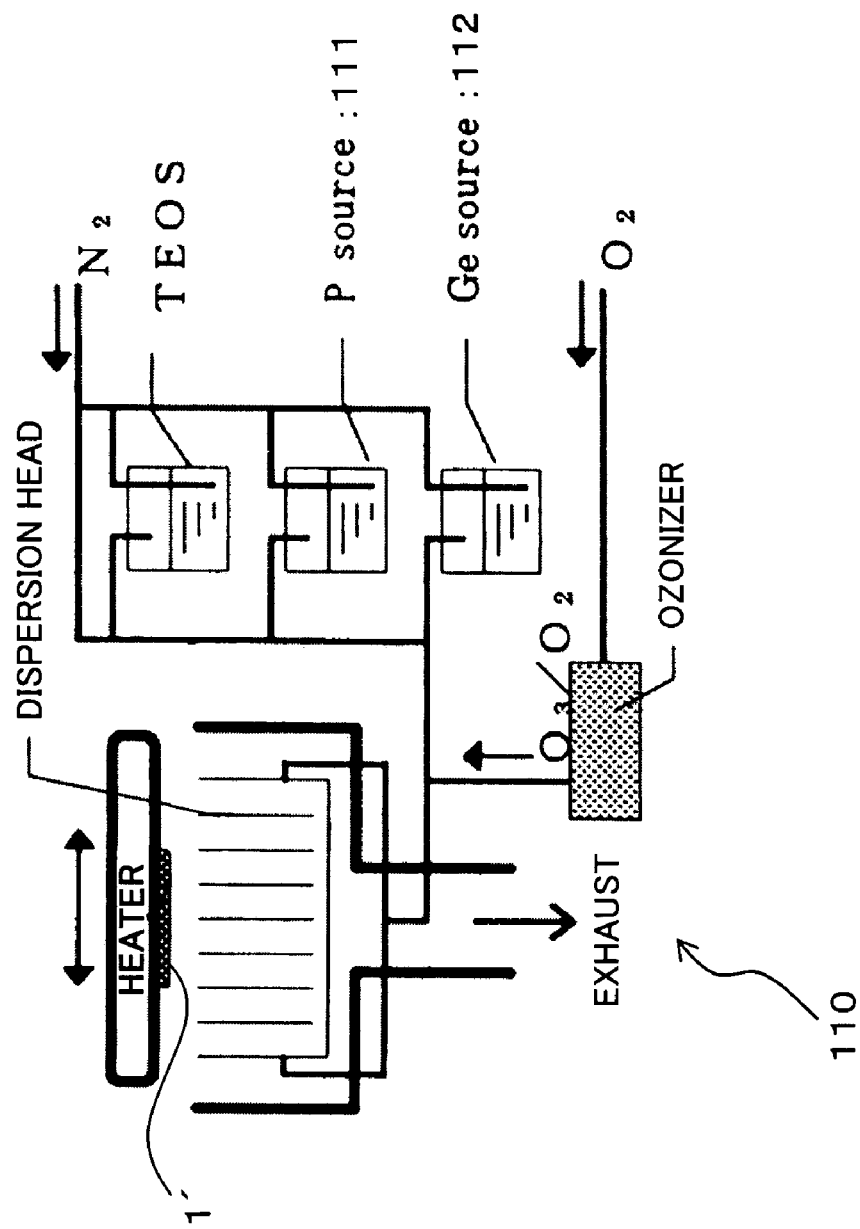
FIG. 6 is a diagram showing a CVD apparatus.

And at the adjustment of the mixing amount of P (phosphorous) and Ge (germanium), as exemplified in FIG. 6, by using a CVD (chemical vapor deposition) apparatus 110, it is sufficient that the amount of gas flow to be supplied to the device 1' passing through a P (phosphorous) source 111 and a Ge (germanium) source 112 is adjusted. When the amount of gas flow is increased, the amount of impurities to be mixed in the clad is increased. In detail, this is described in literatures "Proceedings of the 1996 IEICE (The Institute of Electronics, Information and Communication Engineers of Japan) General conference" and "T. Hanada et al., Transactions of the Institute of Electronics, Information and Communication Engineers of Japan, Electronics, Vol. E80-C, pp. 130 (1997)".

Here, as the above-mentioned refractive index difference generating structure, at least the phase difference generating pattern section 4 is provided with a part in which refractive indexes of light transmitting through the core 103 are different in the direction parallel to the substrate 101 and the direction perpendicular to the substrate 101. And it is not necessary that the part, in which the refractive indexes of light transmitting through the core 103 are different, is disposed at all of the substrate 101, and the part can be disposed at least at all of the phase difference generating pattern section 4.

[A1-2] Explanation of Optical Device 1 According to First Embodiment which Operates as Spectral Filter and Polarized Light Splitting Filter Next, it is explained that the optical device 1 having the above-mentioned structure operates as a spectral filter and a polarized light splitting filter.

[A1-21] Explanation that Optical Device 1 Operates as Spectral Filter

Figure 8:
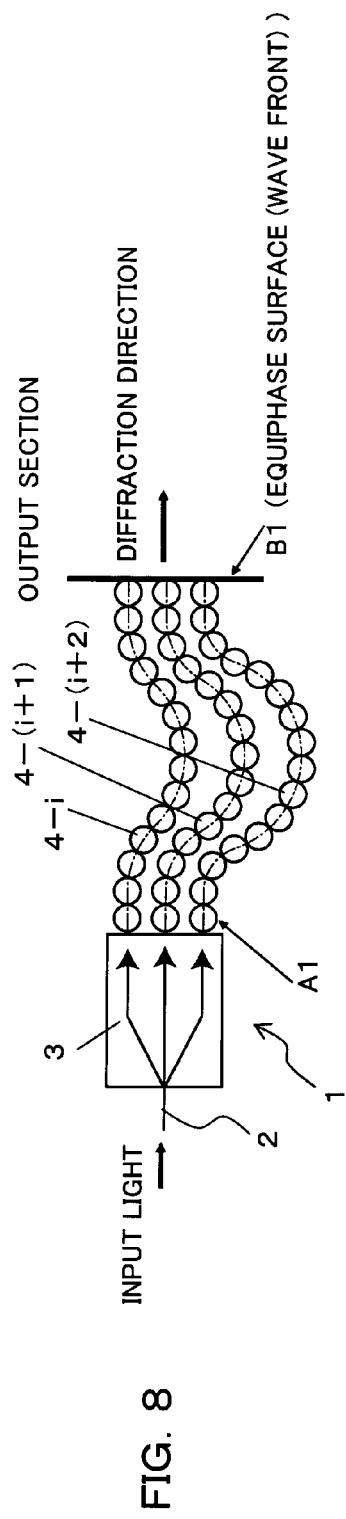
FIGS. 8 to 10 are diagrams for explaining that the optical device according to the first embodiment works as the spectral filter.
Figure 9:
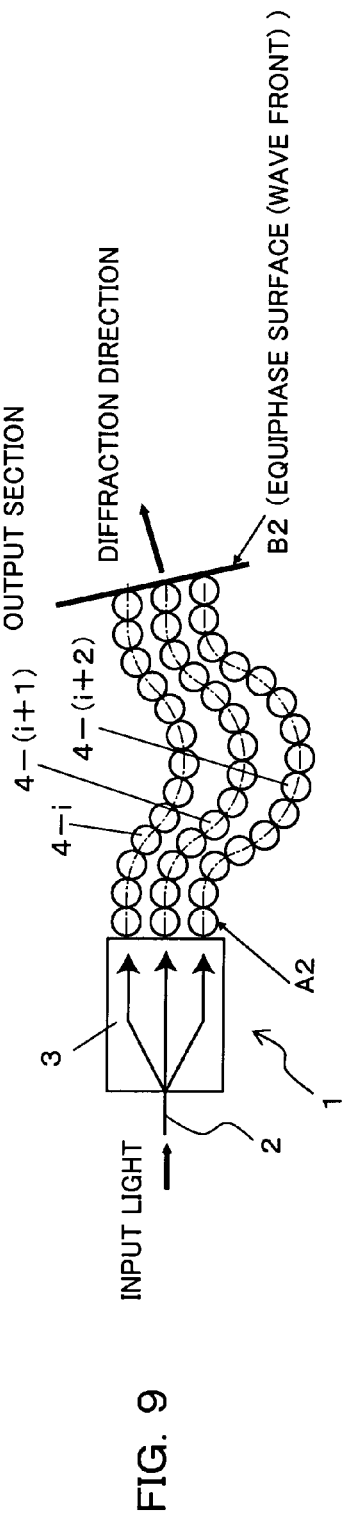
Figure 10:
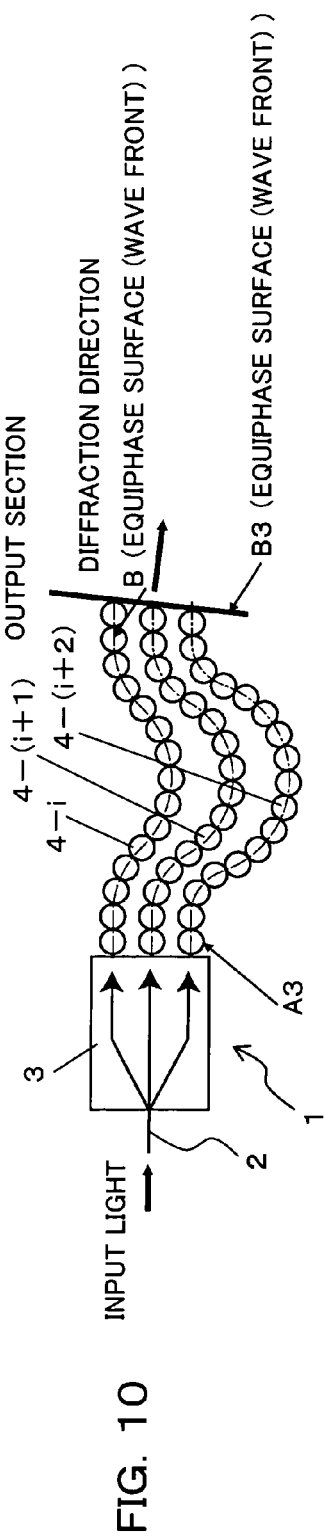

First, referring to FIGS. 7(*a*) and 7(*b*), and FIGS. 8 to 10, it is explained that the optical device 1 operates as a spectral filter. FIG. 7(*a*) is a diagram in which the structure of the optical device 1 according to the first embodiment has been simplified for the sake of convenience of the explanation at the following operation explanation. FIG. 7(*b*) is a schematic diagram for explaining the function of the phase difference generating pattern section 4.

In FIG. 7(*b*), adjacent three waveguide pattern sections 4-*i*, 4-(*i*+1), and 4-(*i*+2) {i: 1 to (n−2)} being a part of the phase difference generating pattern section 4 are focused on and shown in the diagram, and also the input pattern section 2, the diffraction pattern section 3, and the output end 6 are corresponded and shown in the diagram. Here, a circle A described on the waveguide pattern sections 4-*i* to 4-(*i*+2) in FIG. 7(*b*) shows one wavelength of light being transmitted through the phase difference generating pattern section 4.

The length of each of the waveguide pattern sections 4-1 to 4-*n* of which the phase difference generating pattern section 4 is comprised is designed such that the positive number of wavelengths of light of the design center wavelength (wavelength becoming a center of the optical wavelength band being subjected to wavelength multiplexing processing) accurately enters in the core 103 of the waveguide pattern sections 4-1 to 4-*n*, and further is designed such that the difference of the number of wavelengths entering adjacent waveguide pattern sections becomes a constant. In FIG. 7(*b*), a case, in which 14 wavelengths of light of the design center wavelength enter the top (shortest) waveguide pattern section 4-1, 15 wavelengths thereof enter the second from the top waveguide pattern section 4-(*i*+1), and 16 wavelengths thereof enter the bottom (longest) waveguide pattern section 4-(*i*+2) respectively, is exemplified.

That is, in this case, the difference of the lengths among the adjacent waveguide pattern sections 4-*i* to 4-(*i*+2) is one wavelength ($\lambda 0$) of the center wavelength. The difference of the number of the center wavelengths entering among the adjacent waveguide pattern sections 4-*i* to 4-(*i*+2) is said to be the diffraction order "m", and the diffraction order in FIG. 7(*b*) is m=1. The difference of diffraction angle by the difference of wavelength and polarized light becomes large in proportion to the diffraction order, as showing below.

FIGS. 8 to 10 are diagrams explaining the change of the diffraction direction of output light corresponding to the wavelength of light inputting to the optical device 1. FIG. 8 is a case that the wavelength of input light is equal to the design center wavelength, FIG. 9 is a case that the wavelength of input light is longer than the design center wavelength, and FIG. 10 is a case that the wavelength of input light is shorter than the design center wavelength. A1 to A3 in FIGS. 8 to 10 are circles described corresponding to the size of respective wavelengths of light, corresponding to the change of the wavelengths, the circle A2 in FIG. 9 is described larger than the circle A1 in FIG. 8, and the circle A3 in FIG. 10 is described smaller than the circle A1 in FIG. 8.

In the case where that the wavelength of input light is a longer wavelength than the design center wavelength, as shown in FIG. 9, the equiphase surface of light outputted from the waveguide pattern sections 4-*i* to 4-(*i*+2) slants in such a manner that the upper side of the surface of the paper relatively moves in the left, so that, the output light is relatively diffracted to the upper side. On the contrary, in the case where that the wavelength of the input light is a shorter wavelength than the design center wavelength, as shown in FIG. 10, the equiphase surface of light outputted from the waveguide pattern sections 4-*i* to 4-(*i*+2) slants in such a manner that the upper side of the surface of the paper relatively moves in the right, so that, the output light is relatively diffracted to the lower side.

As mentioned above, in the case where that wavelength multiplexed light is inputted to the optical device 1 via the input and output end 5, the diffraction angle of light to be outputted from the phase difference generating patter section 4 is changed corresponding to the wavelength, so that, the optical device 1 can make a spectrum (can de-multiplex for each wavelength).

[A1-22] Explanation that Optical Device 1 Operates as Polarized Light Splitting Filter Next, it is explained that the optical device 1 having the above-mentioned structure operates as a polarized light splitting filter, that is, can execute the polarized light splitting for light of the same wavelength.

In FIGS. 8 to 10, the optical length of the phase difference-generating pattern section 4 is the product of the length of pattern itself and the refractive index. Or the guide wavelength of light transmitting through the phase difference-generating pattern section 4 is the quotient that a wavelength in a vacuum is divided by a refractive index of its medium. Therefore, in the case where that light whose electric field vibrates in the direction parallel to the substrate 101 is defined as TE polarized light and light whose electric field vibrates in the direction perpendicular to the substrate 101 is defined as TM polarized light, when the refractive indexes of the optical device 1 in the direction parallel to the substrate 101 and the direction perpendicular to the substrate 101 are different, the guide wavelength of light transmitting through the phase difference generating pattern section 4 becomes a different value in the TE polarized light and the TM polarized light.

Figure 11:
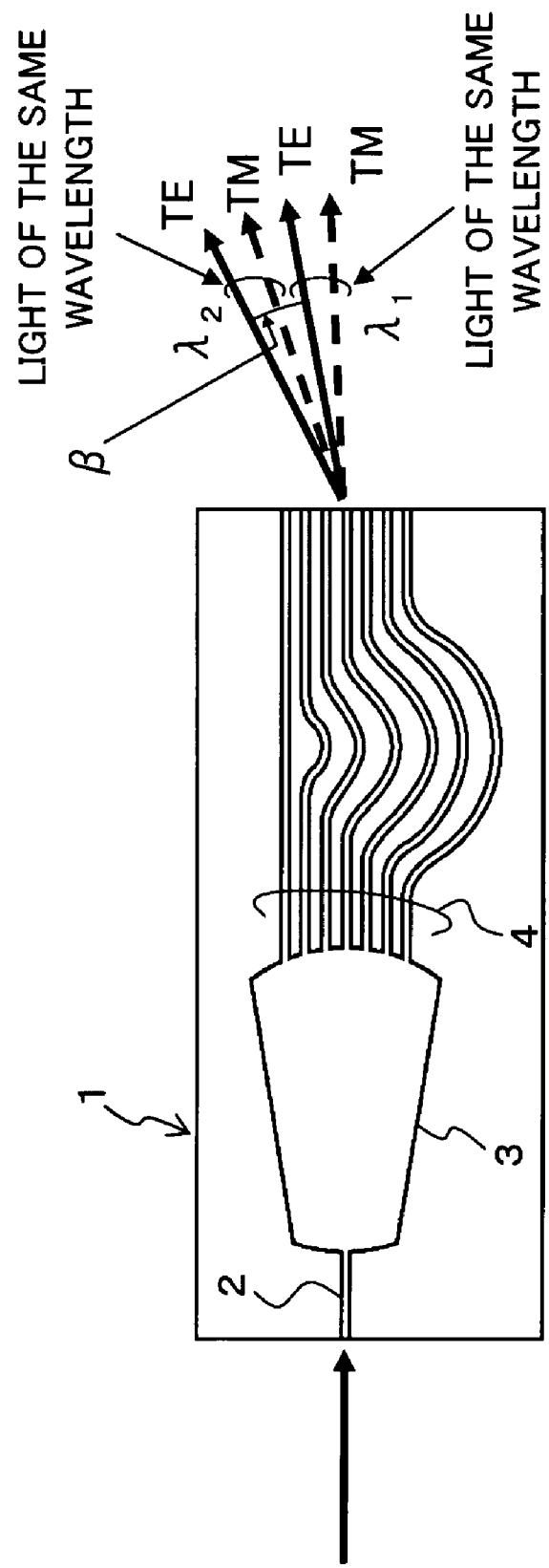
FIGS. 11 and 12 are diagrams for explaining that the optical device according to the first embodiment works as a polarized light splitting filter.

For example, when the design is executed by using the TE polarized light, the light of the center wavelength of the TE polarized light lines as shown in FIG. 8. However, for example, in the case where that the refractive index in the direction perpendicular to the substrate 101 is relatively high, when the light of the center wavelength of the TM polarized light is transmitted through the phase difference generating pattern section 4, the guide wavelength becomes relatively short. Therefore, the equiphase surface of the output light of the TM polarized light becomes equivalent to FIG. 9, and the output light is diffracted to the upper side. This relation is valid for light having a wavelength except the center wavelength, for example, as shown in FIG. 11, the TE polarized light and the TM polarized light of the light of the same wavelength (λ1) can be split.

As mentioned above, by the fact that the substrate 101, the core 103, or the clad 102 of the planar optical waveguide circuit 1 is configured such that the difference between the refractive index in the direction parallel to the substrate 101 and the refractive index in the direction perpendicular to the substrate 101 occurs, the light of the same wavelength can be split into the TE polarized light and the TM polarized light.

And at the optical device 1 according to the first embodiment, as shown in the above-mentioned FIG. 5, as the refractive index difference generating structure, by utilizing the difference of the linear expansion coefficients between the substrate 101 and the clad 102, and a stress is applied only in the direction parallel to the substrate 101, and the difference of the refractive indexes in the direction parallel to and perpendicular to the substrate 101 is generated, so that, a polarized light splitting filter, which can split the light of the same wavelength into the TE polarized light and the TM polarized light, can be configured.

In other words, at the optical device 1 according to the first embodiment, the WDM light inputted from the input and output end 5 is not only de-multiplexed into wavelength components but also, at the same time, each wavelength component can be split into TE polarized light and TM polarized light, and can output them from the output end 6.

Further, in the wavelength de-multiplexing performance, at an AWG (arrayed waveguide grating) being a conventional wavelength de-multiplexing apparatus, a discontinuous transmission spectrum is generated and its transmission band is relatively narrow, however, at the optical device 1 according to the first embodiment, the transmission band does not have any limitation and a low loss of 2.5 dB can be realized even at the minimum.

Figure 12:
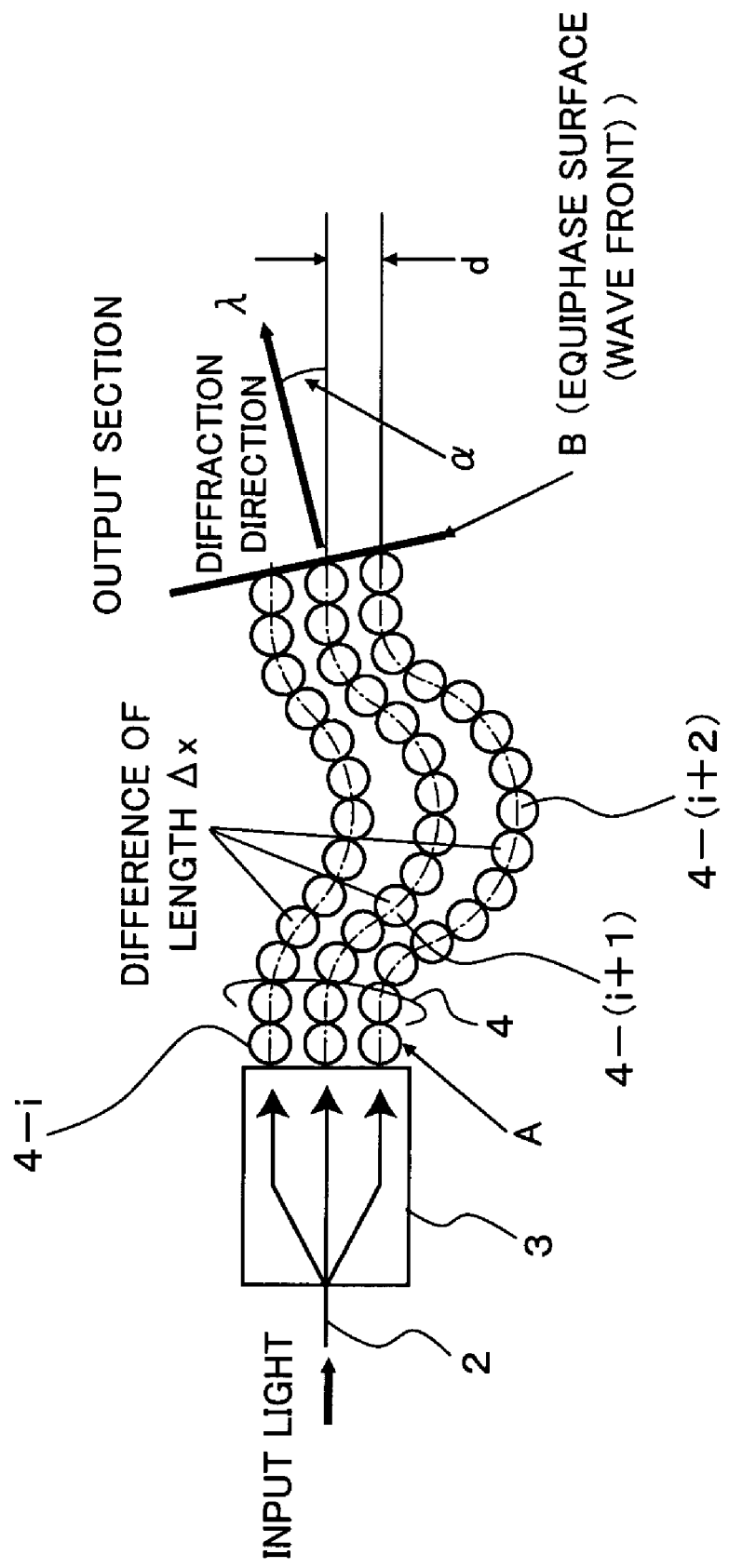

Here, when the wavelength of output light is defined as λ, the design center wavelength (TE polarized light) is defined as λ0, the refractive index of the phase difference generating pattern section 4 is defined as nc, the refractive index of the phase difference generating pattern section 4 for the TE polarized light is defined as ncTE, the refractive index of the phase difference generating pattern section 4 for the TM polarized light is defined as ncTM, and as shown in FIG. 12, the diffraction angle is defined as a, the difference of lengths on the drawing between the adjacent waveguide pattern sections 4-$i$ and 4-$(i+1)$ is defined as Δx, the pitch between the waveguide pattern sections 4-$i$ and 4-$(i+1)$ at the output end 6 is defined as "d", and further, the diffraction order is defined as "m", the design diffraction order is defined as "m0", the difference between the ncTE and the ncTM is defined as d, the diffraction condition equation becomes the following equation (2), and the diffraction angle a can be obtained from the following equation (3).

And the equations (4) and (5) can be applied so that, the diffraction angle for the TE polarized light can be obtained from the equation (6), and the diffraction angle for the TM polarized light can be obtained from the equation (7).

$$d \cdot \sin(\alpha) + nc\Delta x = m\lambda \quad (2)$$

$$\sin(\alpha) = \frac{m\lambda - nc\Delta x}{d} \quad (3)$$

$$ncTE\Delta x = m0\lambda 0 \quad (4)$$

$$ncTM = ncTE + \delta \quad (5)$$

$$\sin(\alpha)_{TE} = \frac{m0(\lambda - \lambda_0)}{d} \quad (6)$$

$$\sin(\alpha)_{TM} = \frac{m0(\lambda - \lambda_0)}{d} - \frac{m0\lambda 0 \frac{\delta}{ncTE}}{d} = \sin(\alpha)_{TE} - \frac{m0\lambda 0 \frac{\delta}{ncTE}}{d} \quad (7)$$

And at the optical device 1 according to the first embodiment, for example, with respect to the above-mentioned diffraction angles of the TE polarized light and the TM polarized light that are split for each wavelength, when the difference of the diffraction angles between the adjacent wavelength channels λ1 and λ2 (refer to FIG. 11) is β, the difference of the diffraction angles of light of the polarized light being orthogonal of the same wavelength can be preferably approximately a half of β. Actually, when the difference of the diffraction angles of each of the TE polarized light at the adjacent wavelength channels λ1 and λ2 is β, the difference between the diffraction angle of the TE polarized light at the wavelength channel λ1 (or λ2) and the diffraction angle of the TM polarized light at the wavelength channel λ1 (or λ2) can be approximately β/2.

Figure 14:
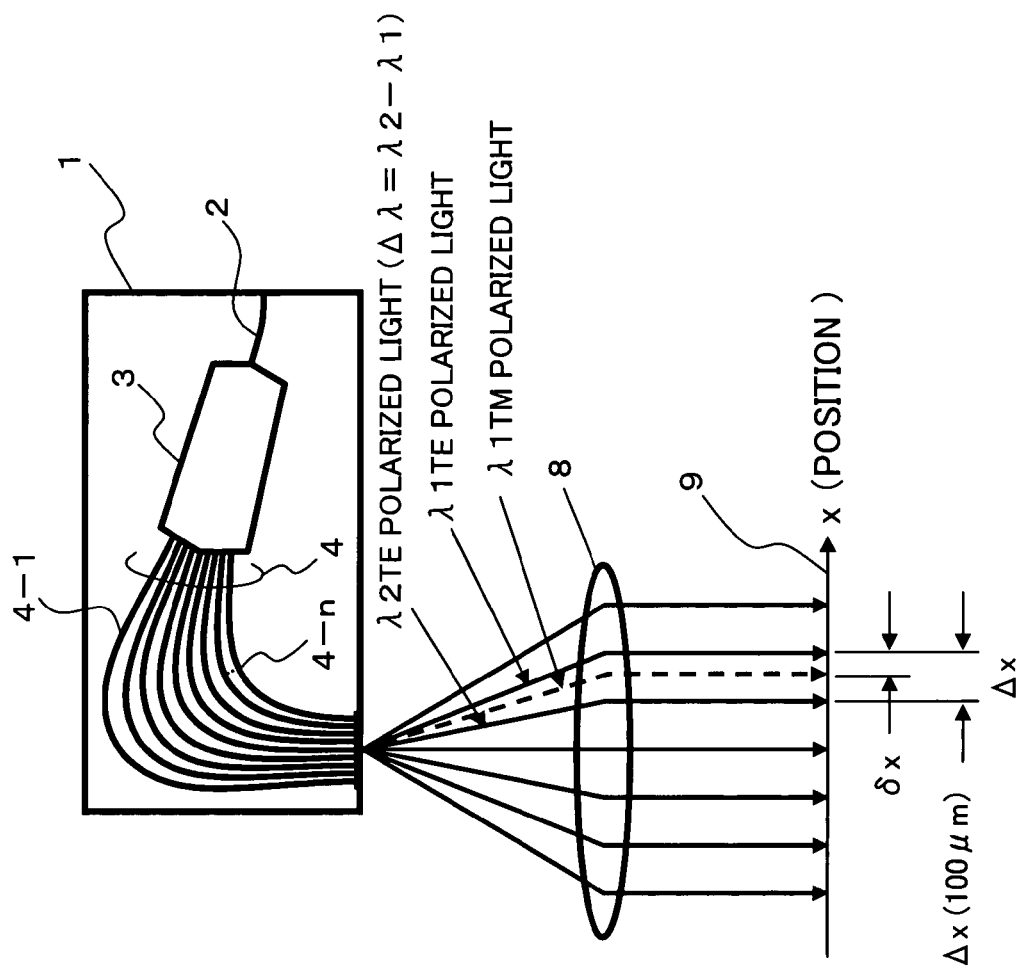

And for example, as shown in FIG. 14 mentioning later, when the optical device 1, a condenser lens 8, and a linear image sensor 9 are disposed such that light outputted from the output end 6 is inputted to the linear image sensor 9 via the condenser lens 8 such as a convex lens, at the linear image sensor 9, the polarized light components for each wavelength component can be monitored individually, for example, a polarized light extinction ratio can be measured. At this time, according to the optical device 1 of the first embodiment, crosstalk between spots of light condensed on the linear image sensor 9 can be made minimum.

[A1-3] Explanation of Specification Example of Optical Device 1 According to First Embodiment The optical device 1 according to the first embodiment, by configured with a specification having the following parameters as an example, can be configured such that the polarized light components for each wavelength can be diffracted by different angles with each other.

Figure 13:
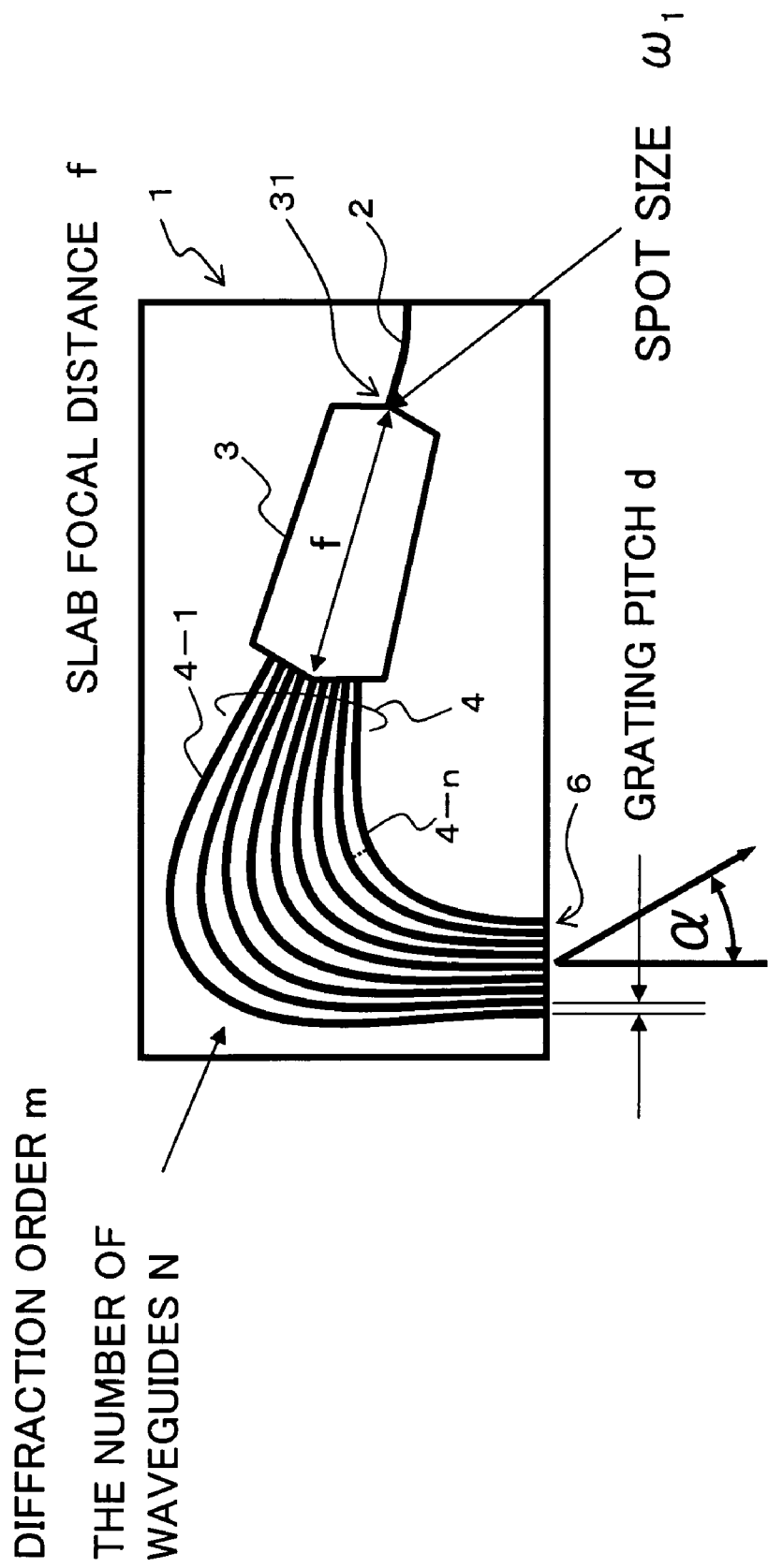
FIGS. 13, 14, 15(*a*), 15(*b*), and 16 are diagrams for explaining the selection of structural parameters of the optical device according to the first embodiment.

[A1-31] Selection of Structural Parameters of Optical Device 1 According to First Embodiment Next, the selection of structural parameters deciding the characteristics of the optical device 1 is explained. The structural parameters to be selected are shown in FIG. 13.

The structural parameters to be selected are a spot size ω1 (a radius in which the intensity becomes 1/e, here, the "e" is the base of natural logarithm) of a light beam in the core at the connecting section 31 of the input pattern section 2 and the diffraction pattern section 3, the length "f1" of the diffraction pattern section 3 (hereinafter, referred to as a slab focal distance "f1"), a pitch among the waveguide pattern sections 4-1 to 4-$n$ of the phase difference generating pattern section 4 at the connecting section 32 of the diffraction pattern section 3, the diffraction order "m" (the diffraction order "m" corresponds to one to one with the difference of the lengths between the adjacent waveguide pattern sections 4-$i$ and 4-($i$+1)), the number "N" (=n) of the waveguide pattern sections 4-1 to 4-$n$, and a core pitch "d" in the waveguide pattern sections 4-1 to 4-$n$ at the output end 6.

First, the "d" and the diffraction order "m" are decided. As exemplified in FIG. 13, when the wavelength of light is made λ, and the diffraction angle is made a, the size $\partial a/\partial \lambda$ (wavelength dispersion) of the variation of diffraction angle for the variation of wavelength is given by the following equation (8)

$$\frac{\partial \alpha}{\partial \lambda} = \frac{m}{d \cdot \cos(\alpha)} \quad (8)$$

By the equation (8), it is understandable that the larger the diffraction order "m" becomes and the smaller the core pitch "d" becomes, the larger the wavelength dispersion becomes. The diffraction order "m" is restricted by the FSR (free spectral range, wavelength range which can be used as a spectroscope), and the core pitch "d" is restricted by the optical coupling (interference) between cores. Here, the center wavelength λ0 of spectroscopic light whose spectrum is obtained is selected to be 1.545 μm, and as the diffraction order "m" in which the FSR of 40 nm can be obtained in this wavelength range, m=38 is selected. And as the core pitch "d" by which the optical coupling between cores becomes sufficiently small, d=10 μm is selected. At this time, the wavelength dispersion ($\partial a/\partial \lambda$) is 0.0038 rad/nm, at near a=0.

The optical device 1 according to the first embodiment, as mentioned above, can directly split, the WDM light inputted with the exposing section 5 used as the input and output end, into polarized light components for each wavelength component (TE polarized light component and TM polarized light component being orthogonal with each other). And as shown in FIG. 14, when the optical device 1, the condenser lens 8, and the linear image sensor 9 are disposed such that light outputted from the output end 6 is inputted to the linear image sensor 9 via the condenser lens 8 such as a convex lens, at the linear image sensor 9, the polarized light components for each wavelength can be monitored individually, for example, a polarized light extinction ratio for each wavelength can be measured.

Here, in order to monitor the polarized light components for each wavelength, at the above-mentioned linear image sensor 9, it is necessary that the condenser lens 8 is disposed such that light outputted from the output end 6 can be inputted to the positions being different from each other on the linear image sensor 9. Here, on the assumption that the focal distance of the condenser lens 8 is "f2", the distance Δx (position dispersion) between condensed positions of light whose wavelength is different by Δλ (Δλ=λ2−λ1) in FIG. 14 is given by the following equation (9). Now, on the assumption that the Δx is 100 μm, from this equation (9), the focal distance of the condenser lens 8 is as follows: f2=32.895 mm.

$$\Delta x = f2 \left\{ \tan\left(\alpha + \frac{\Delta \lambda}{2} \frac{\partial \alpha}{\partial \lambda}\right) - \tan\left(\alpha - \frac{\Delta \lambda}{2} \frac{\partial \alpha}{\partial \lambda}\right) \right\} \approx f2 \cdot \Delta \lambda \cdot \frac{\partial \alpha}{\partial \lambda} \quad (9)$$

Next, the spot size ω1 of the light beam in the core at the connecting section 31, being a structural parameter for selecting the spot size ω2 of the polarized light component for each wavelength component to be inputted to the linear image sensor 9, the slab focal distance "f1", and the number N of the waveguide pattern sections 4-1 to 4-$n$ are selected. In order to split the TE polarized light and TM polarized light of λ1 and the TE polarized light and TM polarized light of λ2, it is necessary that the TE polarized light and TM polarized light of the same wavelength is split.

As mentioned above, in the case where that the pitch (Δx) between light of λ1 and λ2 of the TE polarized light on the linear image sensor 9 is set to 100 μm, when the interference with the adjacent spot is considered, a case, in which the spot pitch between the TE polarized light and the TM polarized light of the same wavelength is made 50 μm, being a half of the pitch of the TE polarized light of λ1 and λ2, is the best condition, and the condition becomes worse in the case where that the spot pitch is wider or narrower than this.

Here, it is assumed that the distance to the adjacent spot becomes close to 45 μm in the worst case, whereupon the spot size ω2 is decided. Needless to say, the smaller the spot size ω2 is, the smaller the interference with the adjacent spot is. Here, as the spot size from which relatively large isolation can be obtained, ω2=15 μm (diameter 30 μm) is selected.

Figure 15:
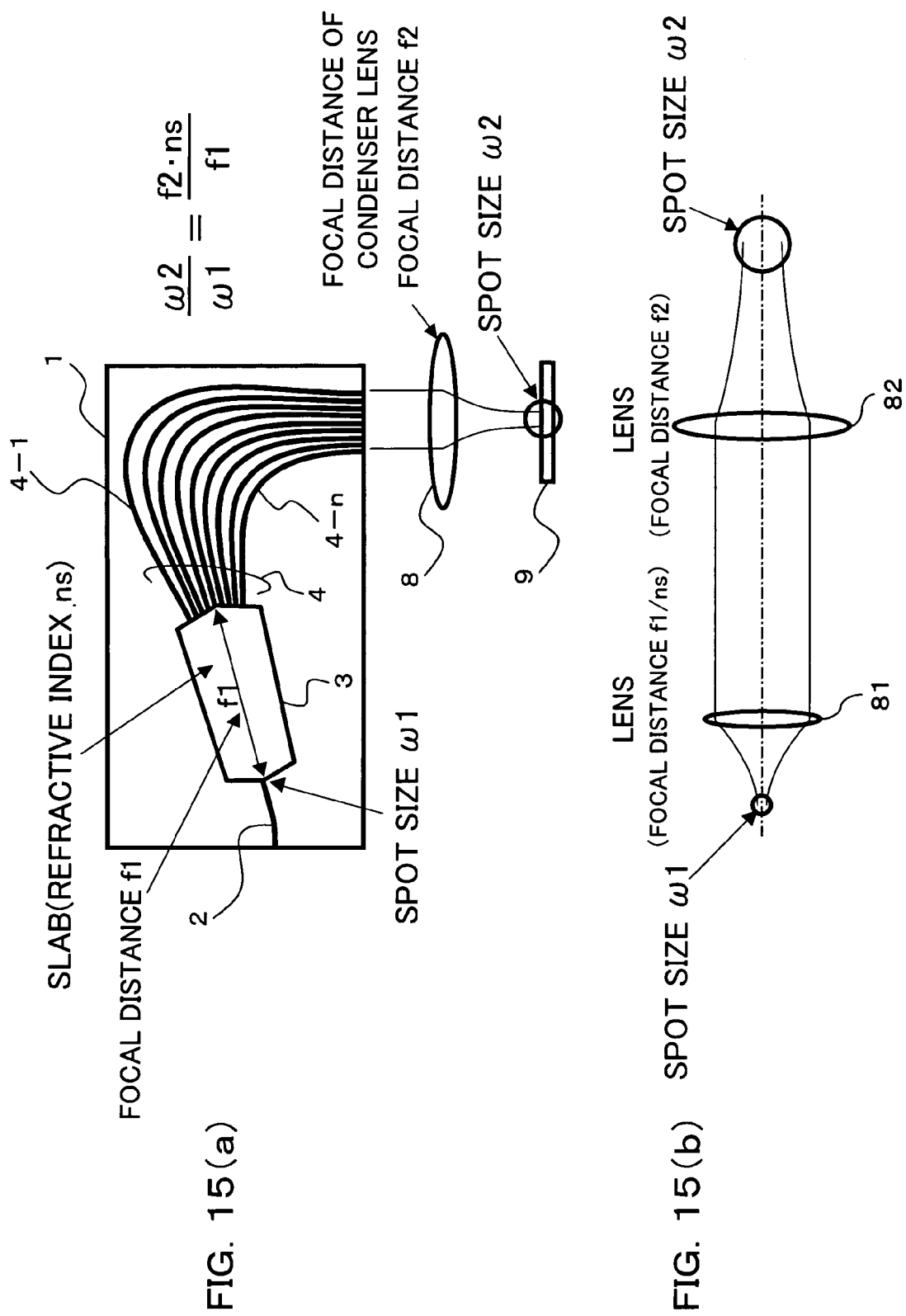

And FIG. 15($a$) is, in the disposition shown in FIG. 14, a diagram showing an optical system in which one polarized light component in one wavelength is focused on. The optical system shown in FIG. 15($a$) is equivalent to an optical system shown in FIG. 15($b$) in which the spot at the connecting section 31 and the spot on the linear image sensor 9 are coupled by lenses 81 and 82.

As shown in FIG. 15($a$), the ω1, ω2, f2, and ns (the effective refractive index of the diffraction pattern section 3 and is approximately 1.458) have the relation of the following equation (10). Here, the ω1 is decided by the specific refractive index difference Δ (refer to the equation (1)) in the input pattern section 2 and the cross section shape of the core 103, and is 2.464 μm at the optical device 1 according to the first embodiment. And when the "f1" is obtained by modifying the above-mentioned equation, f1=7.878 mm.

$$\frac{\omega 2}{\omega 1} = \frac{f2 \cdot ns}{f1} \quad (10)$$

Next, the number N of the waveguide pattern sections 4-1 to 4-$n$, of which the phase difference generating pattern section 4 is comprised, is obtained. The N decides the crosstalk characteristic of the spectrum. Of light expanded by freely transmitting from the connecting section 31 of the input pattern section 2 and the diffraction pattern section 3, when light of wider range is received at the phase difference generating pattern section 4, the crosstalk is lowered. The pitch among the waveguide pattern sections 4-1 to 4-$n$ is a constant, so that, the larger the N is, the wider range light can be received, and the crosstalk becomes low.

In the case where that the distribution of light expanded by freely transmitting from the connecting section 31 of the input and output core pattern section 2 and the slab core pattern section 3 is regarded as a Gaussian beam, when light of 1.5 times or more of the width is received in the Gaussian beam, the crosstalk can be made −30 dB or less. When the pitch, among the waveguide pattern sections 4-1 to 4-$n$ at the connecting section 32 where the diffraction pattern section 3 and the waveguide pattern sections 4-1 to 4-$n$ are connected, is selected to be 10 μm being equal to at the side of the output end 6, and the number N of the waveguide pattern sections 4-1 to 4-$n$ by which the crosstalk is made equal to −30 dB or less is obtained, the number N becomes, for example, approximately 320 pieces.

By the above-mentioned procedures, the selection of the structural parameters as the wavelength spectroscope ends. In FIG. 16, the list of the parameters is shown.

[A1-32] Study of Magnitude of Difference Between Stresses Applied Only in the Direction Parallel to Substrate 101 of Optical Device 1 and TE Polarized Light and TM Polarized Light At the optical device 1 according to the first embodiment, as the refractive index difference generating structure, as shown in the above-mentioned FIGS. 4 and 5, by the stress applied only in the direction parallel to the substrate 101 of the optical device 1, the optical device 1 is curved by the warping amount ($\Delta y$), and the difference between the refractive indexes in the directions parallel to and perpendicular to the substrate 101 is given, and with this, the TE polarized light and the TM polarized light of the same wavelength is split.

Figure 17:
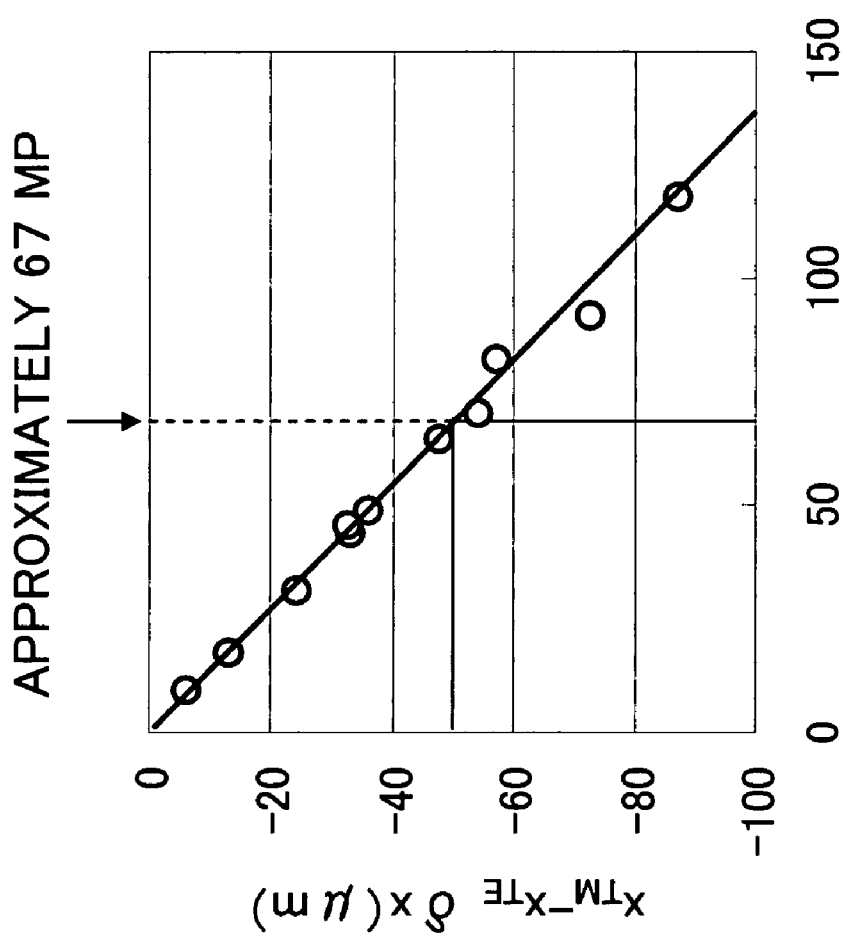
FIGS. 17 and 18 are diagrams for explaining the study of a stress applied only to the direction parallel to the substrate of the optical device according to the first embodiment and the magnitude of a difference of TE polarized light and TM polarized light.

In the case where that the optical device 1 manufactured corresponding to the structural parameters of the above-mentioned [A1-31] and the condenser lens 8 and the linear image sensor 9 are disposed as shown in FIG. 14, the relation, between the magnitude of the stress estimated from the warping amount ($\Delta y$) of the substrate 101 and the magnitude (dx) of the difference of the input positions of the TE polarized light and the TM polarized light of the same wavelength inputted to the linear image sensor 9, is investigated, and as exemplified in FIG. 17, the optimization of the stress (the amount of impurities to be mixed in the clad) is studied. Here, at the disposition shown in FIG. 14, the focal distance of the condenser lens 8 is adjusted such that the position dispersion of light having the frequency difference (wavelength difference: 0.8 nm) of 100 GHz becomes 100 $\mu$m.

As shown Here FIG. 17, the magnitude (dx) of the difference of the input positions of the TE polarized light and the TM polarized light becomes large in proportion to the stress, and when the estimation stress is approximately 67 MP, the dx became approximately 50 $\mu$m, and a value near the optimization is obtained.

Figure 18:
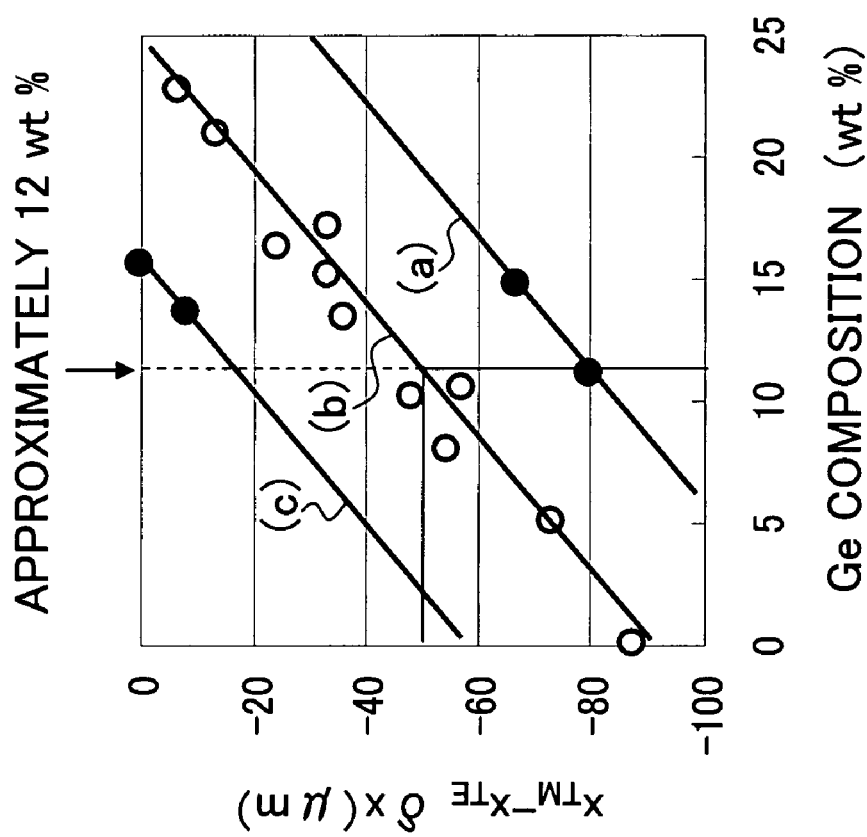

Further, the relation between the estimation impurity-mixing amount (wt %) in the clad and the dx is, for example, shown in FIG. 18. Here, when the mixing amount of P (phosphorous) is approximately 4 wt %, 7 wt %, or 10 wt %, the relation between the Ge mixing amount (wt %) and the dx is distributed as shown in (a) to (c). As shown Here FIG. 18, when the mixing amount of P is 7 wt %, and the mixing amount of Ge is approximately 12 wt %, the estimation stress applied to the clad 102 becomes 67 MP, and the magnitude dx of the difference between the TE polarized light and the TM polarized light of 50 $\mu$m can be obtained. Here, the dimension of the optical device 1 according to the first embodiment can be, for example, 23 mm×13 mm×1 mm.

[A1-4] Effects of Optical Device 1 According to First Embodiment

As mentioned above, according to the optical device 1 of the first embodiment, the core 103 is provided with the input pattern section 2, the diffraction pattern section 3, and the phase difference generating pattern section 4, and at least the phase difference generating pattern section 4 is provided with a part where the refractive indexes of light transmitting in the direction parallel to the substrate 101 and in the direction perpendicular to the substrate 101 are different, so that, the wavelength de-multiplexing function and the polarized light splitting function is realized by one component, and the optical device 1 has an advantage that the size can be smaller than the conventional device.

That is, the optical device 1 is provided with the refractive index difference generating structure that generates the refractive index difference between in the direction parallel to the substrate 101 and in the direction perpendicular to the substrate 101, so that, the wavelength de-multiplexing function and the polarized light splitting function are realized by one component, and the optical device 1 has an advantage that the size can be smaller than the conventional device.

Moreover, an effect of reducing the cost for manufacturing the device that realizes the functions can be also obtained.

Furthermore, when the optical device 1 according to the first embodiment is used as a polarized light splitting device, it is enough that an optical fiber is adhered and fixed to the input pattern section 2, so that, an effect of facilitating the assembling can be obtained. Further, in the case where the wavelength de-multiplexing function of the polarized light splitting device by the optical device 1 is focused on, compared with a conventional AWG (arrayed waveguide grating) device being the wavelength de-multiplexing device using a plane optical waveguide circuit, its transmission band (wavelength band) can be widened, that is, the band limitation can be eliminated, and also the technology for flattop of the transmission band such as a multimode of input waveguide becomes unnecessary, so that, an effect of the insertion loss becoming small by the degree of approximately 2.5 dB or more, can be obtained.

That is, a structure being substantially equivalent to an AWG device can be obtained by connecting an optical fiber for guiding wavelength de-multiplexed light from the condenser lens 8 shown in FIG. 14, however, in this case, since the output spectrum is cut by the width of the optical fiber, the limitation of the output light band occurs. On the contrary, according to the optical device 1 of the present invention, light outputted from the output end 6 is received at the linear image sensor 9, the limitation of the output spectrum can be eliminated.

[A2] Explanation of Modification of First Embodiment

Figure 19:
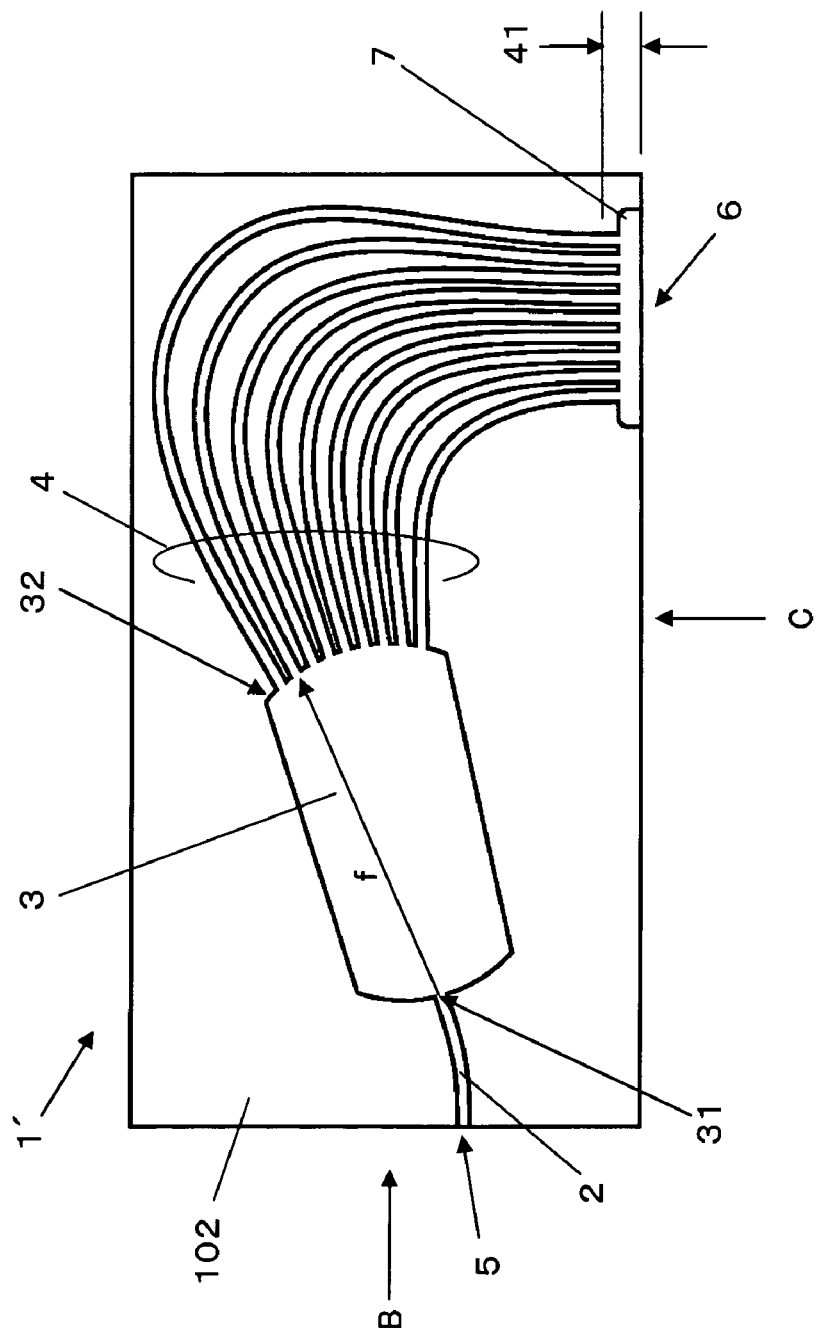
FIGS. 19 to 21 are diagrams showing an optical device according to a modified example of the first embodiment of the present invention.
Figure 20:
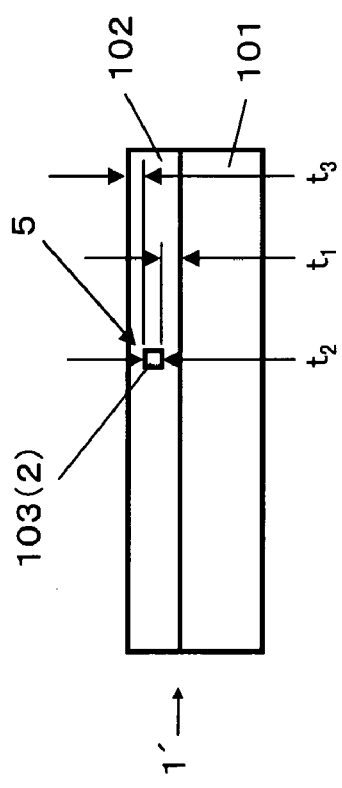
Figure 21:
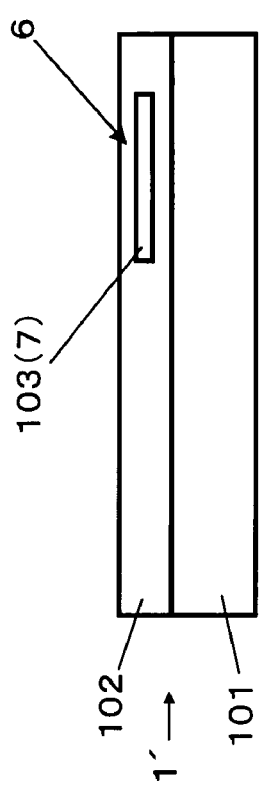

FIGS. 19 to 21 are diagrams showing an optical device 1' according to a modification of the first embodiment of the present invention, and FIG. 19 is a plan view thereof, FIG. 20 is a sectional view thereof at the arrow B shown in FIG. 19, and FIG. 21 is a sectional view thereof at the arrow C shown in FIG. 19. At the optical device 1' shown in FIGS. 19 to 21, compared with the above-mentioned optical device 1 according to the first embodiment, the core 103 is connected to a parallel region 41 of the phase difference generating pattern section 4, and an output core pattern section 7, which is formed with such a wide width that the plurality of waveguide pattern sections 4-1 to 4-n of which the phase difference generating pattern section 4 is comprised are connected in unification, is added at one side edge section of the optical device 1', which added output core pattern section is different from the first embodiment. And other structure except the above-mentioned structure is basically equal to the first embodiment. Here, in FIGS. 19 to 21, the same reference numeral with FIGS. 1 to 3 shows almost the same section.

That is, by the output core pattern section 7, a part at the side of the output end 6 of the waveguide pattern sections 4-1 to 4-n of which the phase difference generating pattern section 4 is comprised has a wide width so that adjacent waveguide pattern sections are connected to each other. Here, as shown in FIG. 21, the side of the output end 6 is exposed at the forming region of the output pattern section 7 formed as the wide region as mentioned above.

At the optical device 1' having the above-mentioned structure, by having the output core pattern section 7, even when processes such as cutting and polishing have been applied to the surface of the output end, the length of the phase difference generating pattern section 4 can be kept in a constant, so that, the diffraction center wavelength is not changed even when the processes such as cutting and polishing were applied to the surface of the output end, and an advantage, which the decline of spectrum crosstalk performance caused by the unevenness after the polishing is prevented, can be obtained. And in the case where that the end surface is formed by cutting or polishing, even when the end surface has become slant, since the length of the waveguide pattern sections 4-1 to 4-$n$ of which the phase difference generating pattern section 4 is comprised does not change, so that, an effect of characteristics becoming stable, can be obtained.

Here, at the above-mentioned first embodiment, the phase difference generating pattern section 4 is formed by a pattern in which light transmitting through the phase difference generating patter section 4 is outputted from the surface being not facing the input and output end 5, however, according to the present invention, as shown in FIG. 11, even when the phase difference generating pattern section 4 is formed by a pattern in which light transmitting through the phase difference generating patter section 4 is outputted from the surface being facing the input and output end 5, it is needless to say that a substantially equivalent wavelength spectrum characteristic and the polarized light splitting characteristic can be obtained.

[B] Explanation of Second Embodiment

[B-1] Structure of Polarization Monitor 100 According to Second Embodiment

Figure 22:
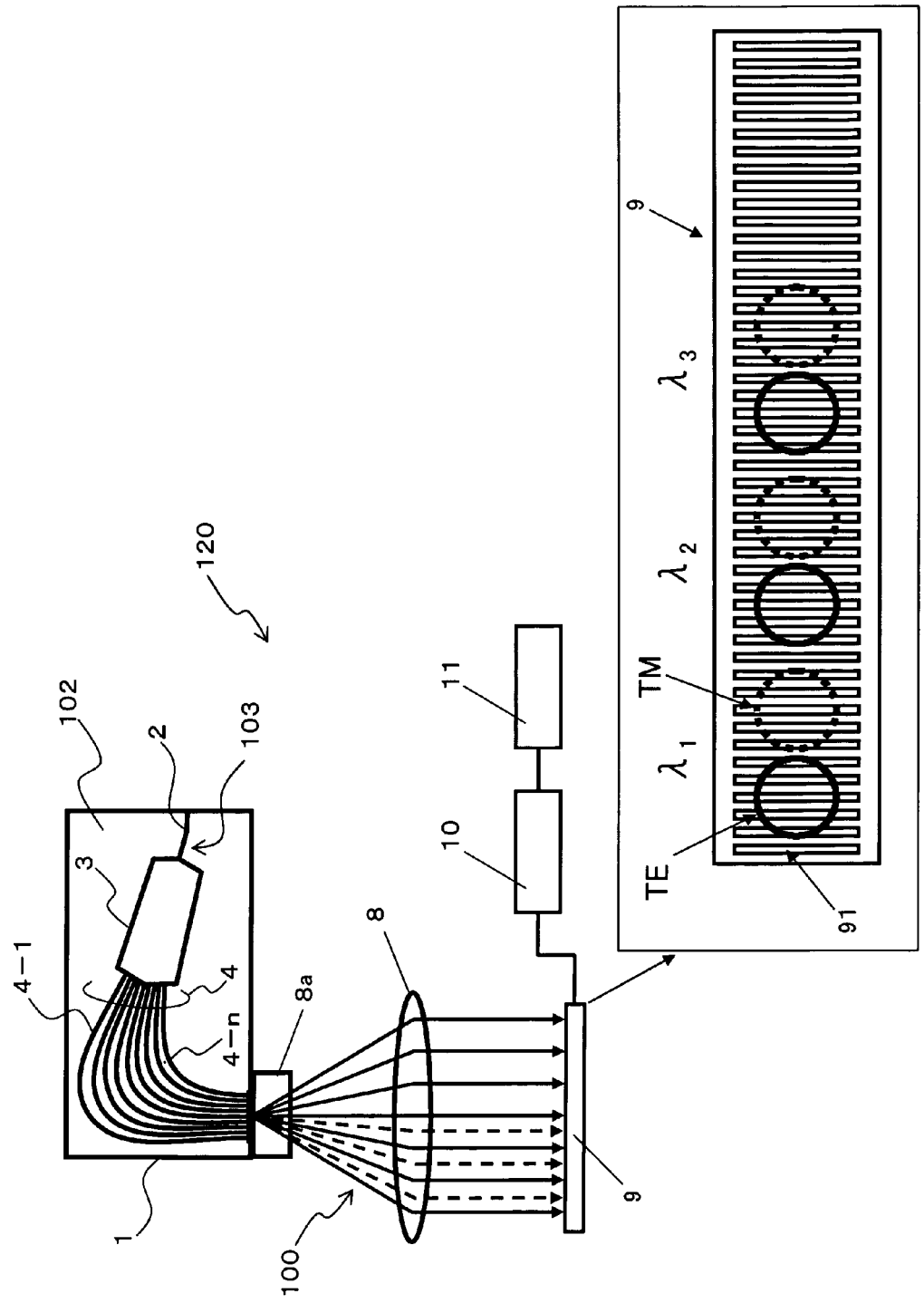
FIG. 22 is a diagram showing a polarization monitor according to a second embodiment of the present invention.

FIG. 22 is a diagram showing a polarization monitor 100 according to a second embodiment of the present invention. The polarization monitor 100 according to the second embodiment has a structure that is provided with the optical device 1 of the above-mentioned first embodiment, a cylindrical lens 8$a$, a convex lens 8 being a condenser lens, and a linear image sensor 9. And by connecting an operating section 10 to the linear image sensor 9 being a part of the polarization monitor 100, a polarized light extinction ratio measuring device 120, which is comprised of the above-mentioned polarization monitor 100 and the operating section 10, is formed.

Here, the cylindrical lens 8$a$ is disposed at the side position corresponding to the output end 6 of the optical device 1, and makes light expanding in the direction perpendicular to the surface of the paper in FIG. 22 parallel. The convex lens 8 (the condenser lens 8), similar to the above-mentioned one shown in FIG. 14, makes light outputted from the optical device 1 and expanded in the direction parallel to the surface of the paper in FIG. 22 parallel light and guides the parallel light to the linear image sensor 9. In other words, the convex lens 8, in the light outputted from the phase difference generating pattern section 4, can condense light in which a constant frequency interval is diffracted by a constant angle difference and light of two polarized light components being orthogonal for each wavelength is diffracted in different angles from each other, and can make the condensed light parallel light.

Further, the linear image sensor 9 is configured as a photoelectric conversion section having an array shape, which is disposed near the condensed point of light condensed by the fact that the light is transmitted through the convex lens 8 such that the linear image sensor 9 can generate an electric signal pattern in proportion to the light intensity change corresponding to the position of the condensed point image of the light. Actually, the linear image sensor 9 can be a device in which approximately 256 pieces of photoelectric conversion cells (photoelectric conversion section) 91 having the width of approximately 10 $\mu$m and the length of approximately 250 $\mu$m in the up and down direction are arrayed with 25 $\mu$m pitch.

With this structure, the TE polarized light components and the TM polarized light components of each wavelength of the WDM light inputted to the input and output light transmitting pattern section 2 can be received at the positions being different from each other on the linear image sensor 9, so that, the intensity of the TE polarized light components and the TM polarized light components of each wavelength can be monitored. Here, at the polarization monitor 100 according to the second embodiment, in order to be able to monitor the TE polarized light components and the TM polarized light components optimally, the specification of the optical device 1 described in detail at the above-mentioned first embodiment is provided, and also the convex lens 8 is disposed.

Figure 23:
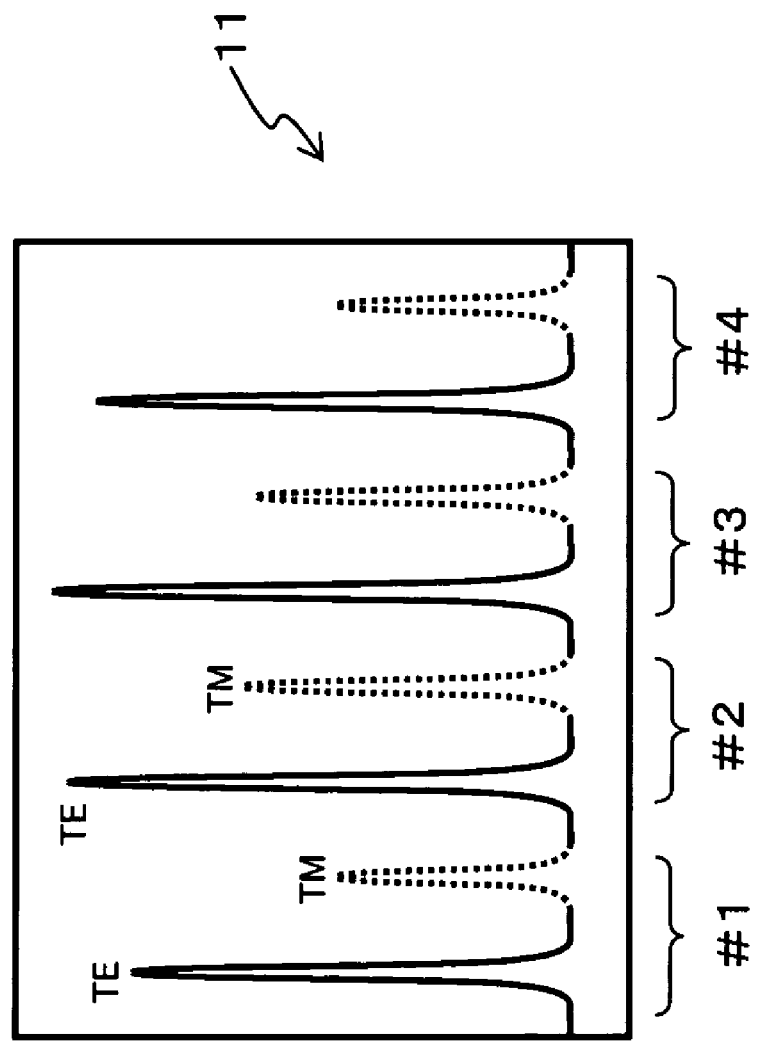
FIG. 23 is a diagram for explaining the display of the TE polarized light intensity and the TM polarized intensity of each wavelength according to the second embodiment of the present invention.

And the operating section 10 applies analog to digital conversion to the output from the linear image sensor, and after this, executes an operation process, and can measure the polarized light intensity ratio and the like of the TE polarized light and the TM polarized light for each wavelength component, and the polarized light intensity ratio of the TE polarized light and the TM polarized light being the measured results and the light intensity on the linear image sensor 9 can be displayed on a displaying section 11. For example, as shown in FIG. 23, the TE polarized light intensity and the TM polarized intensity of each of wavelength components (#1 to #4) can be displayed on the displaying section 11.

[B-2] Effects

By the above-mentioned structure, at the polarization monitor 100 according to the second embodiment, by using the optical device 1 configured similar to the case of the above-mentioned first embodiment, the TE polarized light components and the TM polarized components of each wavelength of the WDM light inputted to the input and output light transmitting pattern section 2 can be split and outputted, so that, the polarized light components of each of the wavelength components can be received at the positions being different from each other on the linear image sensor 9 via the cylindrical lens 8$a$ and the convex lens 8, and the intensity of the TE polarized light components and the TM polarized components of each wavelength can be monitored individually. And also the polarized light extinction ratio can be measured at the operating section 10, based on the TE polarized light components and the TM polarized components of each of the wavelengths monitored individually.

As mentioned above, according to the second embodiment of the present invention, since the optical device 1 at the first embodiment is used, there is an advantage that the polarized light extinction ratios of a plurality of wavelengths can be measured at the same time.

And also, the wavelength de-multiplexing and the polarized light splitting can be executed by the optical device 1 being one component, and the photoelectric conversion can be applied to the power of wavelength de-multiplexed and polarized light split light by one linear image sensor 9, so that there is an advantage that the power of wavelength de-multiplexed and polarized light split light can be monitored by a device having a simpler structure being smaller than the conventional device, and also it is possible to realize a small type polarized light extinction ratio measuring device by the smaller number of parts than the conventional device.

Furthermore, the alignment between the device executing the wavelength de-multiplexing and the polarized light splitting and the linear image sensor 9 can be carried out at one time, so that, there is attained an effect that the assembling labor and hour can be reduced.

[C] Explanation of Third Embodiment

[C-1] Structure of Polarization Monitor 130 According to Third Embodiment

Figure 24:
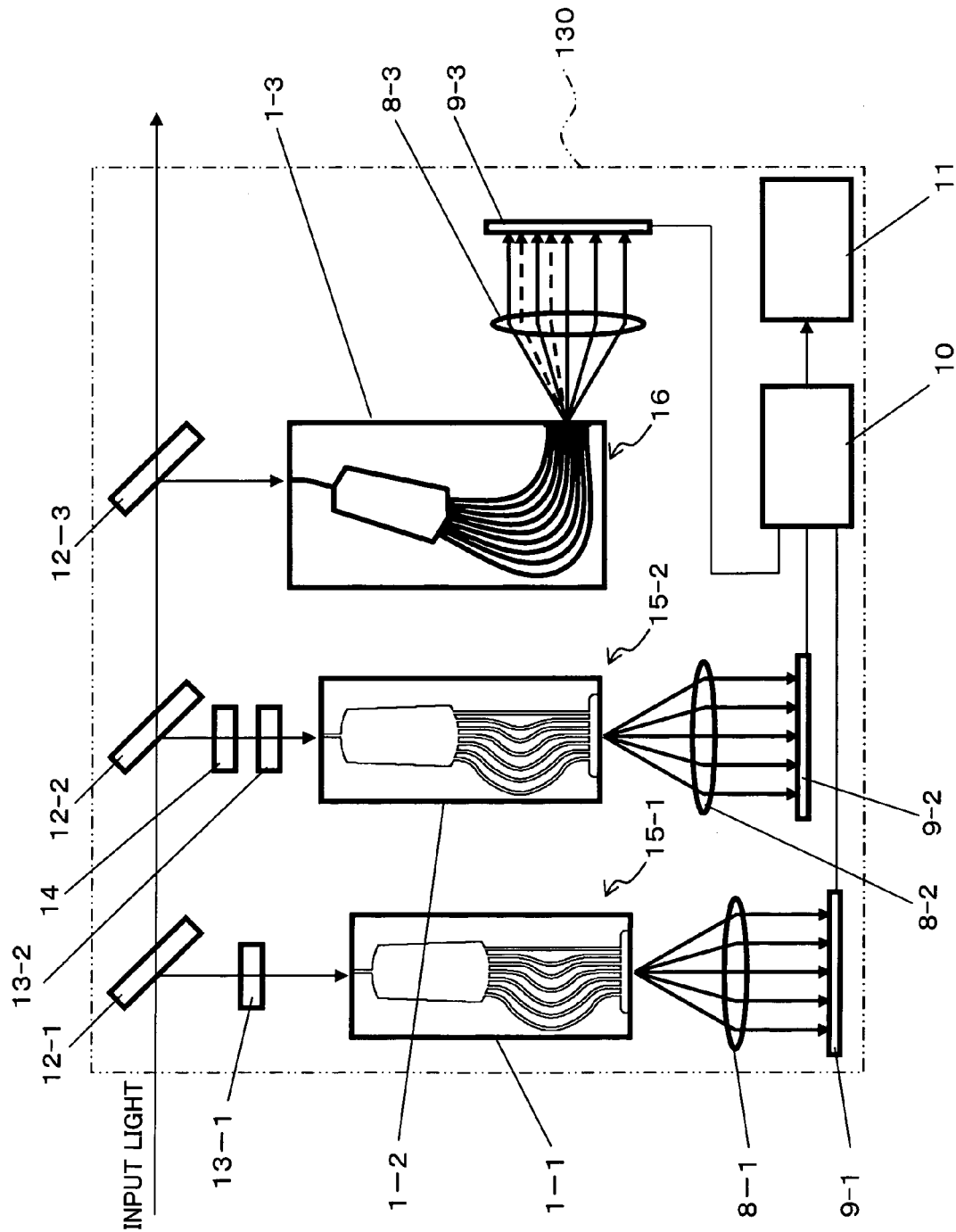
FIG. 24 is a diagram showing a polarization monitor according to a third embodiment of the present invention.

FIG. 24 is a diagram showing a polarization monitor 130 according to a third embodiment of the present invention. The polarization monitor 130 according to the third embodiment also uses, similar to the case of the above-mentioned second embodiment, the optical device 1 according to the above-mentioned first embodiment, and further can output values (refer to P1 to P4 in equations (11) to (14) mentioning later) for obtaining polarized light vector components represented on the Poincare sphere of each wavelength. This is different from the second embodiment.

Here, the polarization monitor 130 shown in FIG. 24 has a structure that is provided with an optical device 1-3, which has a structure similar to the case of the above-mentioned first embodiment, optical devices 1-1 and 1-2, convex lenses 8-1 to 8-3, linear image sensors 9-1 to 9-3, beam splitters 12-1 to 12-3, analyzers 13-1 and 13-2, and a quarter wavelength plate 14.

Figure 31:
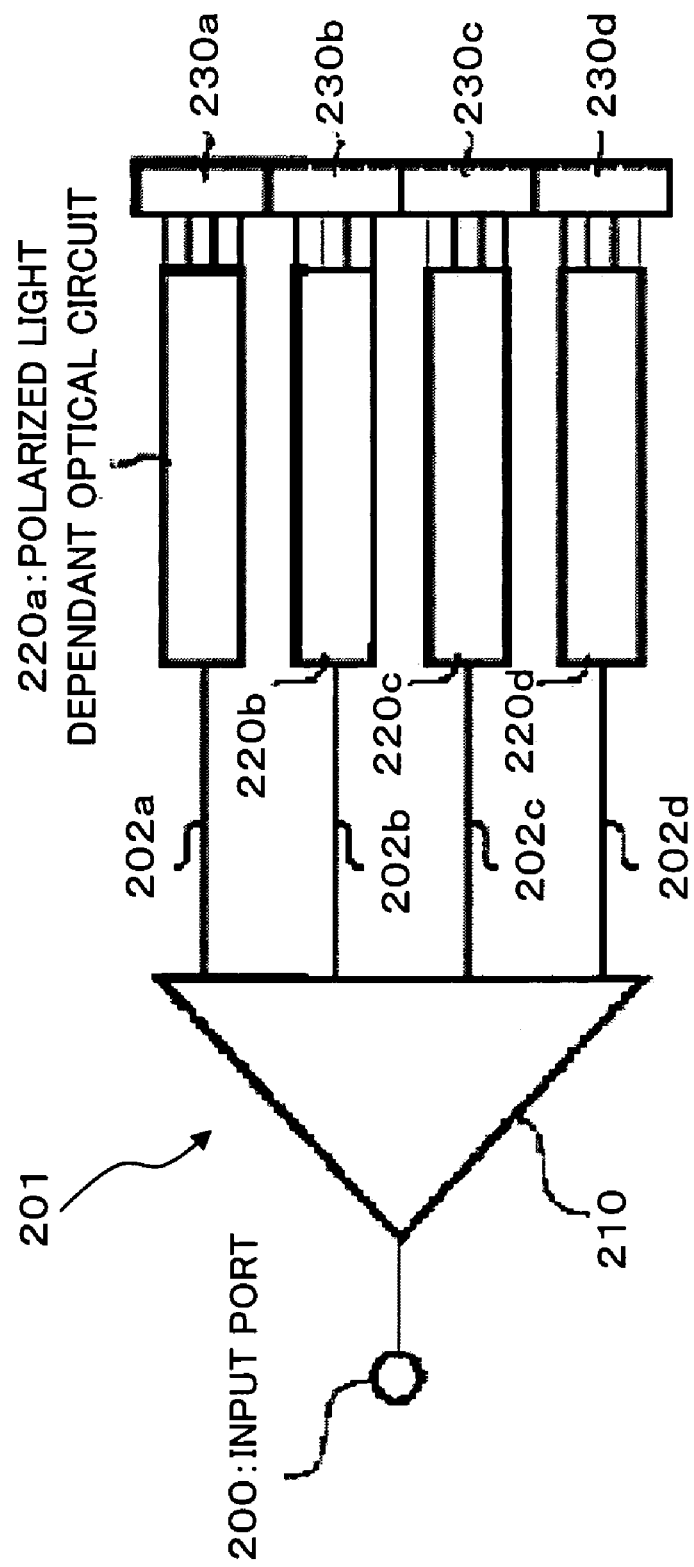
FIGS. 31 and 32 are diagrams showing a conventional polarization monitor.

The polarization monitor 130 shown in FIG. 24, compared with the above-mentioned conventional polarization monitor 201 shown in FIG. 31, does not execute the wavelength de-multiplexing at the stage before the polarized light splitting, executes the wavelength de-multiplexing at the optical devices 1-1 to 1-3, and executes the wavelength de-multiplexing and the polarized light splitting at the optical device 1-3 at the same time. This is different from the conventional polarization monitor. Therefore, the polarization monitor 130 according to the third embodiment does not provide the polarized light dependent optical circuits 220a to 220d being a redundant structure, which the above-mentioned polarization monitor 201 shown in FIG. 31 is provided with, but, before the linear image sensors 9-1 to 9-3 being the photoelectric conversion devices, is provided with the optical devices 1-1 and 1-2 for executing the de-multiplexing of WDM light, and is provided with the optical device 1-3 that executes the wavelength de-multiplexing and the polarized light splitting at the same time, similar to the optical device 1 at the above-mentioned first embodiment.

That is, at the polarization monitor 130 according to the third embodiment, being different from the above-mentioned polarization monitor 201 shown in FIG. 31, it is not necessary to execute the wavelength de-multiplexing for input light at the stage before the polarized light splitting, and also it is not necessary to provide the redundant structure like the polarized light dependent optical circuit 220a to 220d, and the calculation of values for obtaining the polarized light vector components represented on the Poincare sphere can be executed.

Here, the beam splitters 12-1 to 12-3 are disposed on the optical path of the input light in this order, and function as optical splitters that can split the WDM light inputted as the input light into first to third power split light by the fact that these beam splitters 12-1 to 12-3 cooperate.

That is, the beam splitter (a first beam splitter) 12-1 can split the input light into two light, and outputs one split light to the analyzer 13-1 as the first split light, and outputs the other split light to the beam splitter 12-2 disposed at the post-stage. And the beam splitter (a second beam splitter) 12-2 further splits the other split light split at the beam splitter 12-1 into two light, and outputs one split light to the quarter wavelength plate 14 as the second split light, and outputs the other split light to the beam splitter 12-3 disposed at the post-stage. Further, the beam splitter 12-3 further splits the other split light split at the beam splitter 12-2 into two light, and outputs one split light to the optical device 1-3 as the third split light.

And the analyzer (a first analyzer) 13-1 can detect the polarized light state of one light de-multiplexed at the beam splitter 12-1, the optical device 1-1 is provided with core patterns similar to the optical device 1 according to the above-mentioned first embodiment and de-multiplexes the wavelengths of output from the analyzer 13-1. Further, the convex lens 8-1 makes light outputted with different diffraction angles in each wavelength component from the optical device 1-1 parallel light, and the linear image sensor 9-1 is configured as a photoelectric conversion device in which the photoelectric conversion cells are disposed in an array shape and can execute the photoelectric conversion for light of each of wavelength components from the convex lens 8-1 individually.

In other words, the optical device 1-1, the convex lens 8-1, and the linear image sensor 9-1 mentioned above are configured as a first optical monitor section 15-1 that can monitor the light intensity of light of each of the wavelength components outputted from the analyzer 13-1.

And the quarter wavelength plate 14 is disposed on an optical path of one light split at the beam splitter 12-2, and the analyzer (a second analyzer) 13-2, to which one light split at the beam splitter 12-2 is inputted via the quarter wavelength plate 14, detects the polarized light state of one light split at this beam splitter 12-2.

Further, the optical device 1-2 has a structure similar to the above-mentioned optical device 1-1, and executes the wavelength de-multiplexing for output from the analyzer 13-2. Further, the photoelectric conversion can be applied to light, to which the wavelength de-multiplexing has been carried out, outputted from the optical device 1-2 at the linear image sensor 9-2 via the convex lens 8-2.

In other words, the optical device 1-2, the convex lens 8-2, and the linear image sensor 9-2 mentioned above configure a second optical monitor section 15-2 that can monitor the intensity of light of each of the wavelength components outputted from the analyzer 13-2.

And the optical device 1-3 has a structure similar to the above-mentioned optical device 1 at the first embodiment, and for one light split at the beam splitter 12-3, executes the wavelength de-multiplexing and also splits into two polarized light components (TE polarized light and TM polarized Light) being orthogonal at each of the wavelengths. Further, the photoelectric conversion can be applied to the wavelength components of each of the wavelengths outputted from the this optical device 1-3, similar to the polarization monitor 120 according to the above-mentioned second embodiment, at the linear image sensor 9-3 via the convex lens 8-3.

In other words, the optical device 1-3, the convex lens 8-3, and the linear image sensor 9-3 mentioned above enable to configure a polarization monitor section 16 that can monitor two polarized light components being orthogonal of each wavelength component of a third split light split at the beam splitter 12-3 being a splitting section.

Figure 25:
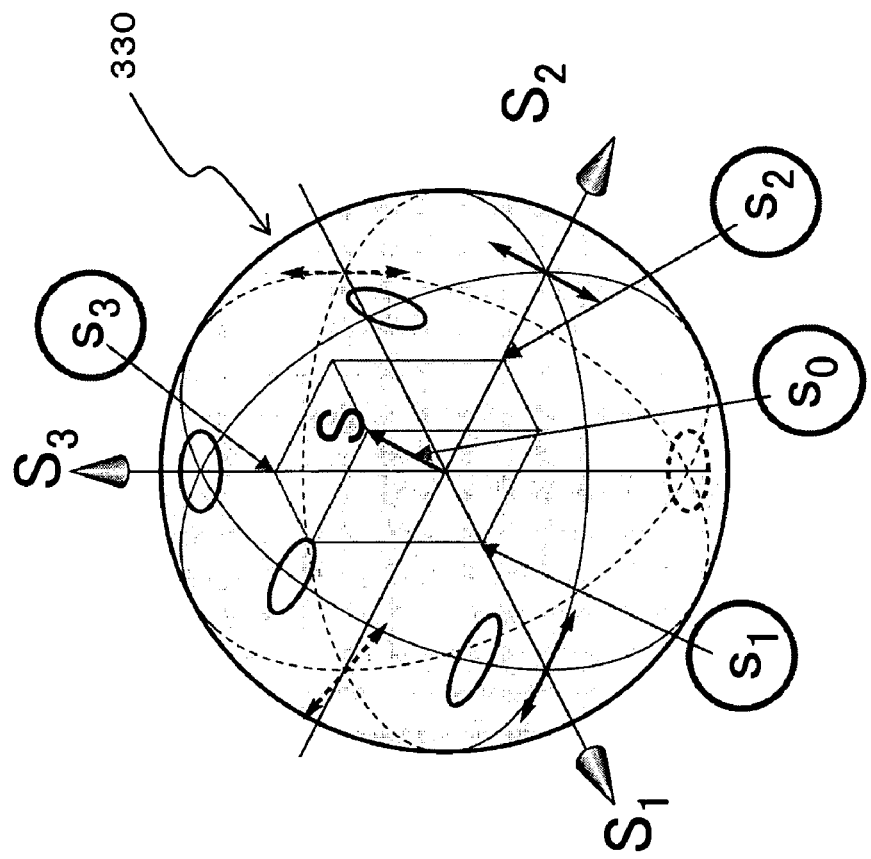
FIG. 25 is a diagram showing a Poincare sphere.

And the polarization monitor 130 according to the third embodiment is provided with an operating section 10 (polarized light state operating section) and a displaying section 11. Based on the values of the intensity of two polarized light components of each of the wavelength components applied the photoelectric conversion at each of the above-mentioned linear image sensors 9-1 to 9-3, the operating section 10 can calculate the polarized state of each of the wavelength components, that is, can calculate the polarized vector components on a Poincare sphere 330 as shown in FIG. 25 by operation. Here, the displaying section 11 can display the operated results at the operating section 10 on request.

That is, at the operating section 10, when the monitored result of the light intensity of each wavelength from the linear image sensor 9-1 is defined as P1 in the following equation (13), the monitored result of the light intensity of each wavelength from the linear image sensor 9-2 is defined as P2 in the following equation (14), the monitored result of the light intensity of the TE polarized light at each of wavelength components from the linear image sensor 9-3 is defined as P3 in the following equations (11) and (12), and the monitored result of the light intensity of the TM polarized light at each of wavelength components from the linear image sensor 9-3 is defined as P4 in the following equations (11) and (12), the polarized light spectrum components s0 to s3 represented on the Poincare sphere can be calculated.

$$S0 = P3 + P4 \quad (11)$$

$$S1 = P3 - P4 \quad (12)$$

$$S2 = 2P1 - (P3 + P4) \quad (13)$$

$$S3 = 2P2 - (P3 + P4) \quad (14)$$

Here, the above-mentioned optical devices 1-1 and 1-2 are optical devices that the above-mentioned optical device 1 according to the first embodiment is adjusted such that the stress applied to the optical devices 1-1 and 1-2 becomes almost zero. Actually, for example, it is enough that the relatively large amount of P (phosphorous) and Ge (germanium) are mixed into the silica glass of which the clad 102 is comprised, or B (boron) and P (phosphorous) are mixed into the silica glass of which the clad 102 is comprised. This technology has been described, for example, in the lecture reports 1, pp. 222 (1999), at the Electronics Society Conference 1999, The Institute of Electronics, Information and Communication Engineers.

And also, at the above-mentioned optical devices 1-1 and 1-2, similar to the optical device 1 according to the first embodiment, the refractive index difference generating structure, which generates the refractive index difference between in the direction parallel to the substrate and in the direction perpendicular to the substrate, can be provided.

[C-2] Effects

With the above-mentioned structure, at the polarization monitor 130 according to the third embodiment, by using each of the monitored results outputted from linear image sensors 9-1 to 9-3, the operating section 10 can calculate the polarized wave state of each of the wavelength components of the WDM light inputted as the input light, that is, can calculate the vector components s0 to s3 on the Poincare sphere by the operation.

Figure 26:
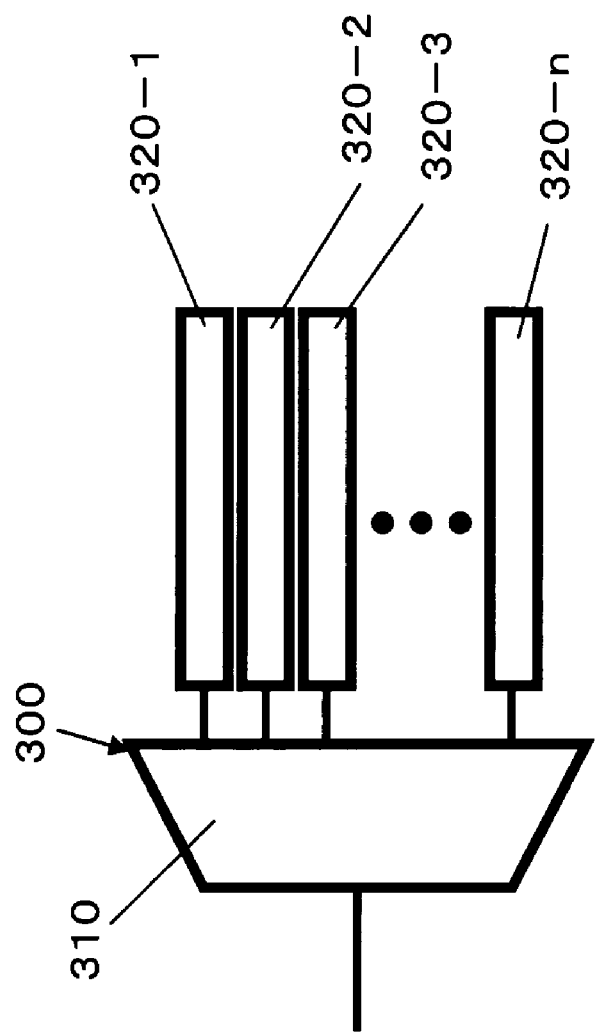
FIGS. 26 to 28 are diagrams for explaining effects of the polarization monitor according to the third embodiment of the present invention.
Figure 27:
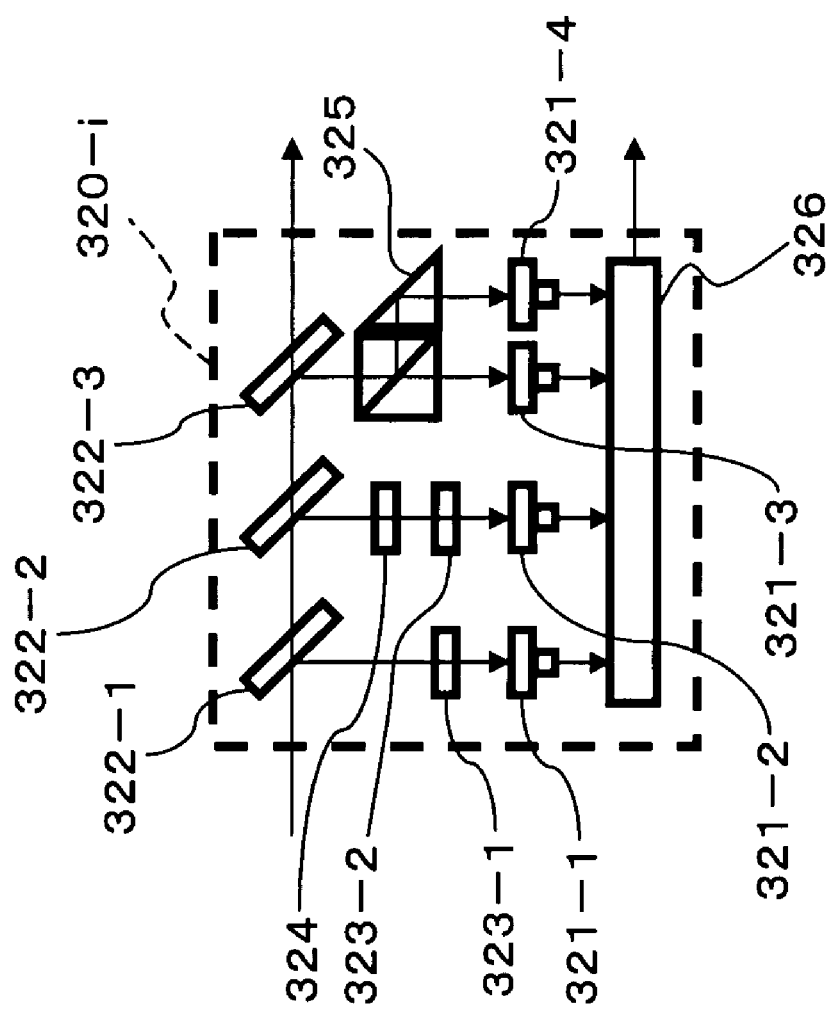
Figure 28:
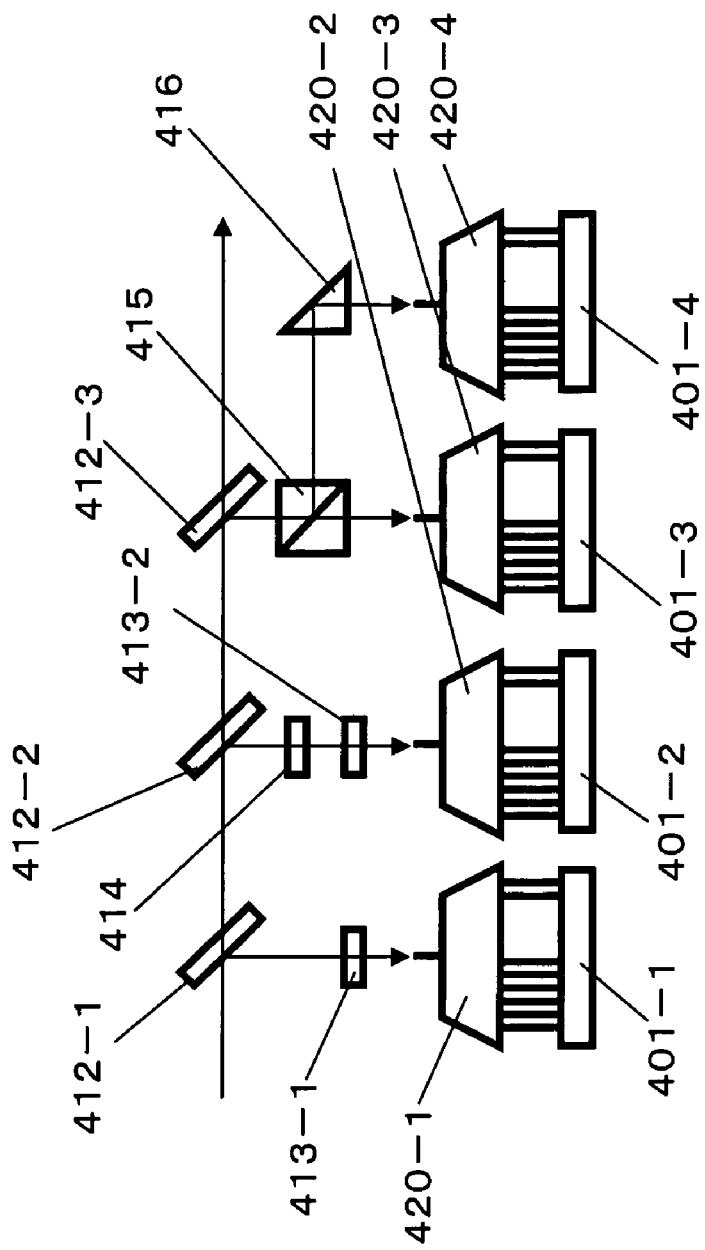

Here, as a polarization monitor that monitors polarized light of light having a plurality of wavelengths, for example, it is considerable that a polarization monitor 300 shown in FIGS. 26 and 27, and a polarization monitor 400 shown in FIG. 28 are configured.

Here, the polarization monitor 300, as shown in FIG. 26, is comprised of a wavelength de-multiplexing filter 310 and a plurality of individual polarization monitor sections 320-1 to 320-n. Each polarization monitor section 320-i (i=1 to n), as shown in FIG. 27, is provided with beam splitters 322-1 to 322-3, analyzers 323-1 and 323-2, a quarter wavelength plate 324, a polarized light beam splitter 325, photoelectric conversion elements 321-1 to 321-4, and an operating section 326. And the operating section 326 calculates the polarized light vector components s0 to s3 on the Poincare sphere by making respective outputs from the photoelectric conversion elements 321-1 to 321-4 as the above-mentioned P1 to P4 (refer to the equations (11) to (14)). Here, the polarization monitor 300 shown in FIGS. 26 and 27 has a structure being substantially similar to that of the polarization monitor 201 shown in FIGS. 31 and 32.

And the polarization monitor 400 shown in FIG. 28 is comprised of beam splitters 412-1 to 412-3, analyzers 413-1 and 413-2, a quarter wavelength plate 414, a polarized light beam splitter 415, a mirror 416, wavelength de-multiplexing filters 420-1 to 420-4, and photoelectric conversion devices 401-1 to 401-4 having an array shape. The polarization monitor 400 shown in FIG. 28 is the one in which the function as the wavelength de-multiplexing filter 310 in the polarization monitor 300 shown in FIGS. 26 and 27 is integrated in the polarization monitor section 320-i and a redundant structure is not provided.

At the above-mentioned polarization monitor 300 shown in FIGS. 26 and 27, it is necessary to provide redundant polarization monitor sections corresponding to the number of wavelengths, for example, when the number of wavelengths is 40, 40 pieces of individual polarization monitor sections 320-i are required.

On the other hand, the polarization monitor 130 according to the third embodiment does not need to provide many polarization monitor sections corresponding to the number of wavelengths, such as the above-mentioned polarization monitor 300 exemplified in FIGS. 26 and 27, and consequently has advantages that its size can be made smaller and the cost for manufacturing the device can be made lower.

Further, the polarization monitor 130 according to the third embodiment, compared with the polarization monitor 400 shown in FIG. 28, does not need the polarized light beam splitter 415 and the mirror 416, and further can reduce the function as two pieces of the wavelength de-multiplexing filters 420-3 and 420-4 to one piece of the polarization monitor section 16, and also can reduce two pieces of the photoelectric conversion devices 401-3 and 401-4 having the array shape to one piece of the linear image sensor 9-3 being the photoelectric conversion device having the array shape, so that, even when this is compared with the structure exemplified in FIG. 28, has advantages that its size is made smaller and the cost is made lower.

Figure 32:
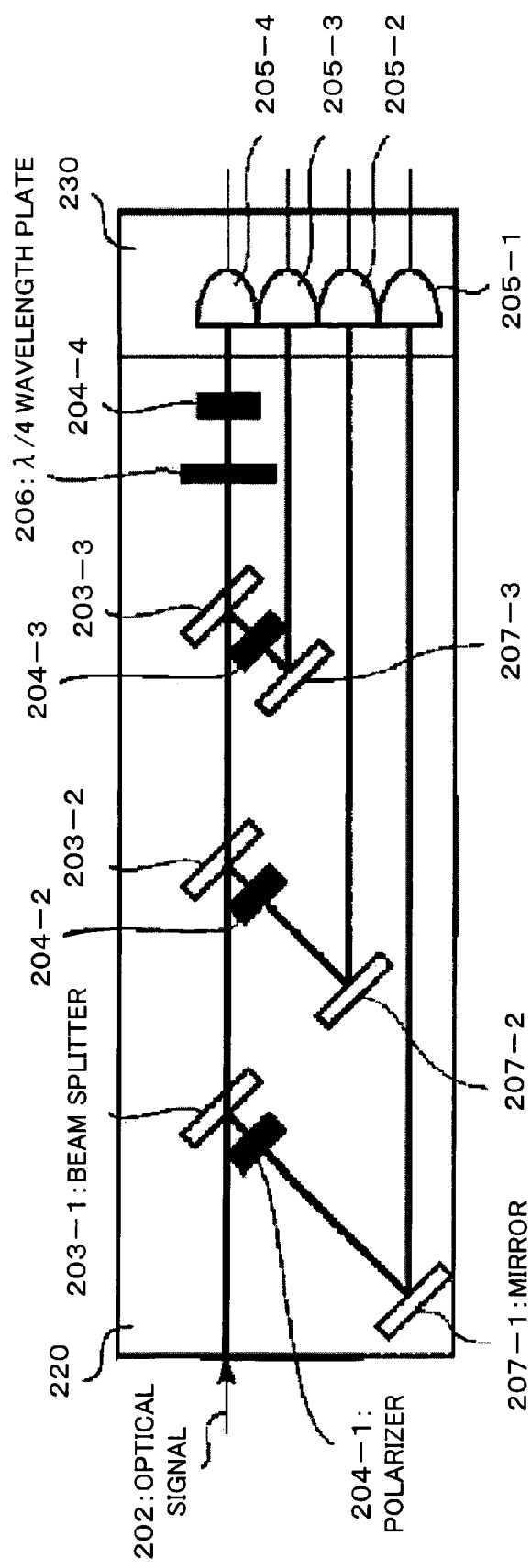

As mentioned above, the polarization monitor 130 according to the third embodiment of the present invention is provided with the first and second light monitor sections 15-1 and 15-2 and the polarization monitor section 16, with this, has a structure being simpler than the above-mentioned structure shown in FIGS. 31 and 32, therefore, has advantages that can calculate the polarized wave state of each of the wavelength components of the WDM light inputted as the input light, that is, can calculate the vector components s0 to s3 on the Poincare sphere by the operation.

[D] Explanation of Fourth Embodiment

[D-1] Structure of Optical Switch According to Forth Embodiment

Figure 29:
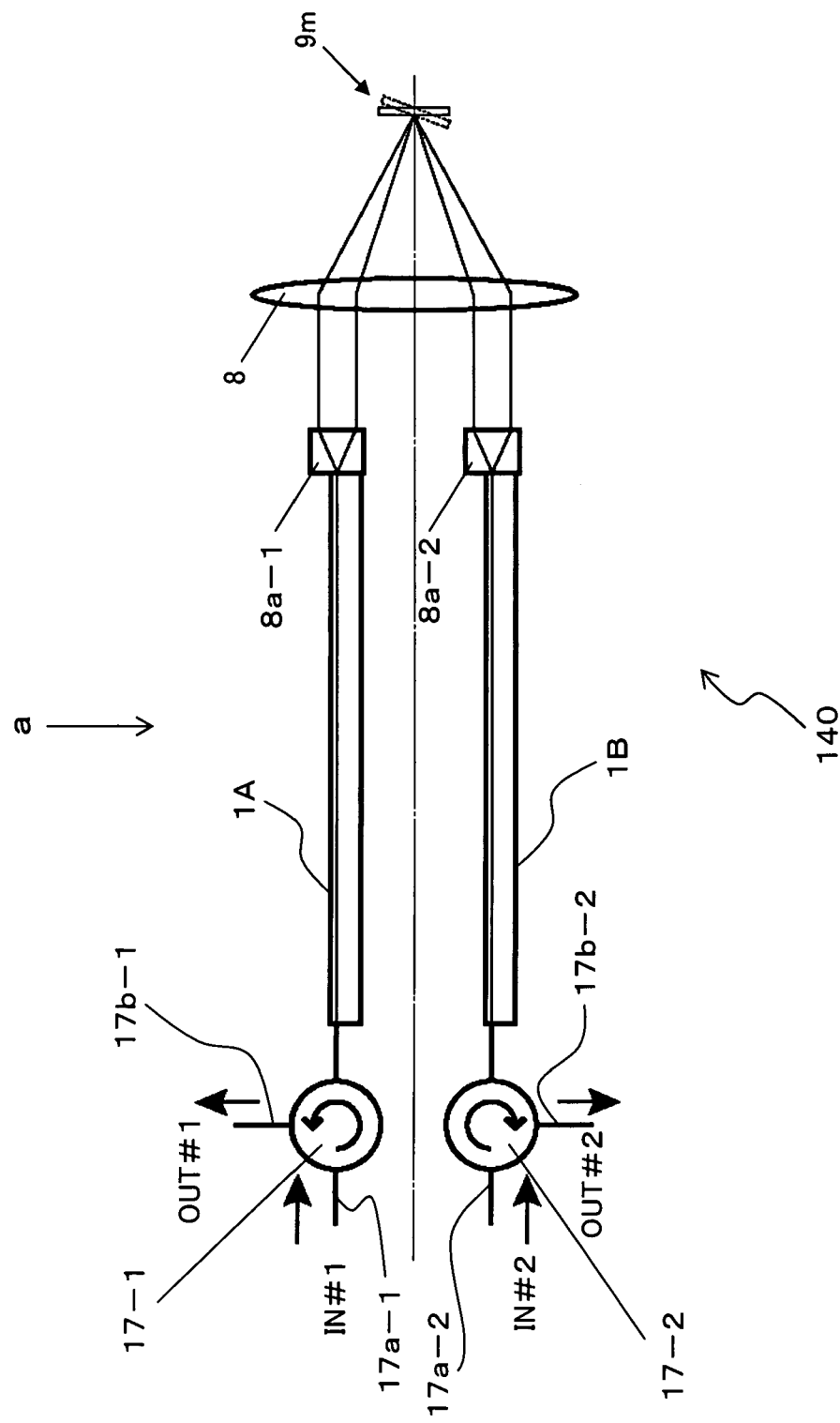
FIGS. 29 and 30 are diagrams showing an optical switch according to a fourth embodiment of the present invention.

FIG. 29 is a diagram showing an optical switch 140 according to a fourth embodiment of the present invention. The optical switch 140 shown in FIG. 29 is configured as a wavelength selecting switch for WDM light by using first and second optical devices 1A and 1B being similar to the optical device 1 according to the above-mentioned first embodiment (refer to the reference numeral 1 shown in FIGS. 1 to 3). That is, the optical switch 140 according to the fourth embodiment has a structure that is provided with optical circulators 17-1 and 17-2, the first and second optical devices 1A and 1B, first and second cylindrical lenses 8a-1 and 8a-2, a lens 18, and a mirror 9m.

Here, the first optical circulator 17-1 is provided with an input port 17a-1 (IN#1) and an output port 17b-1 (OUT#1) and is optically coupled with an input and output light transmitting pattern section 2 of the first optical device 1A, and the second optical circulator 17-2 is provided with an input port 17a-2 (IN#2) and an output port 17b-2 (OUT#2) and is optically coupled with an input and output light transmitting pattern section 2 of the second optical device 1B. And light inputted from the input ports 17a-1 and 17a-2 of the first and second optical circulators 17-1 and 17-2 is outputted to the respective input and output light transmitting pattern sections 2 of the optically coupled first and second optical devices 1A and 1B, and light outputted from the input and output light transmitting pattern sections 2 is outputted from the respective output ports 17b-1 and 17b-2.

By the above-mentioned structure, WDM light inputted to the input port 17a-1 of the first optical circulator 17-1 is, at the first optical device 1A, de-multiplexed into wavelengths and split into polarized light, and light is outputted as light split into two polarized light being orthogonal for each wavelength. Likewise, WDM light inputted to the input port 17a-2 of the second optical circulator 17-2 is, at the second optical device 1B, de-multiplexed into wavelengths and split into polarized light, and light is outputted as light split into two polarized light being orthogonal for each wavelength.

And the first cylindrical lens 8a-1 is disposed at the position of the output end 6 of the first optical device 1A, and makes light outputted from the output end 6 parallel in the up and down direction of the surface of the paper of FIG. 29. Likewise, the second cylindrical lens 8a-2 is disposed at the position of the output end 6 of the second optical device 1B, and makes light outputted from the output end 6 parallel in the up and down direction of the surface of the paper of FIG. 29.

Figure 30:
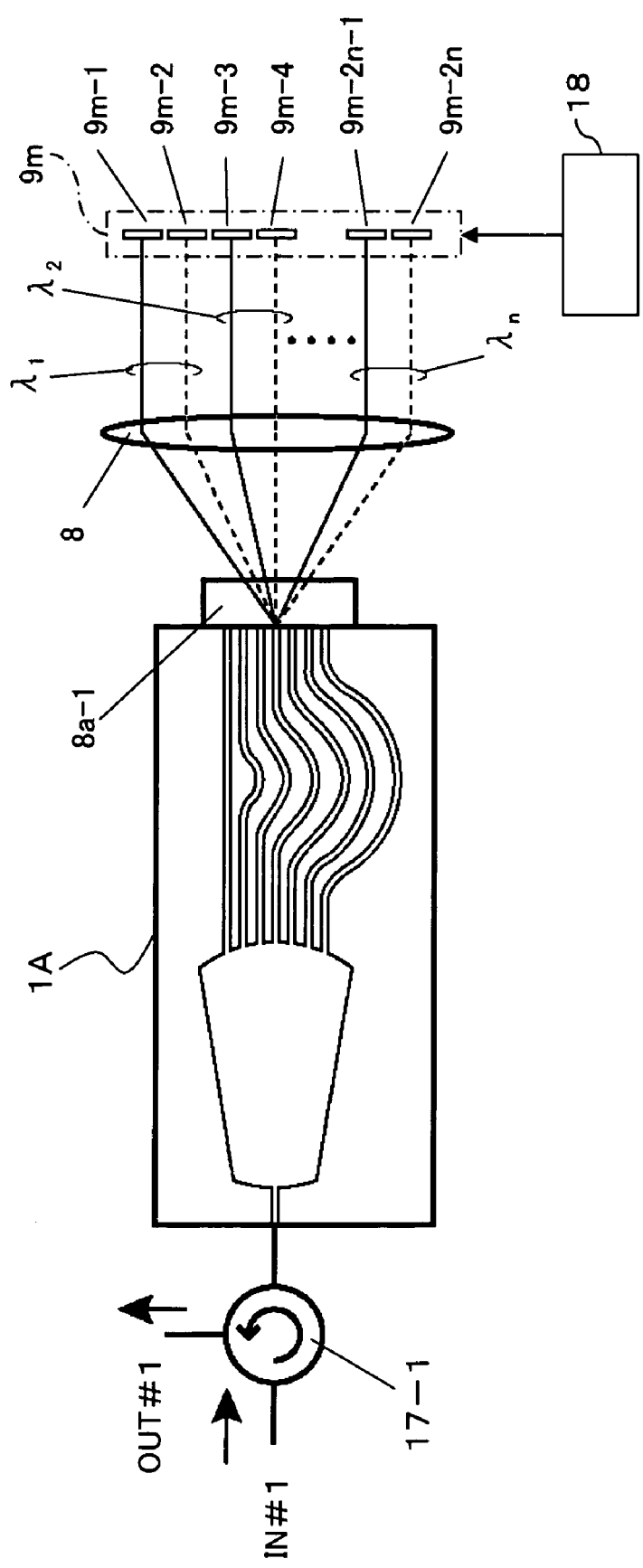

FIG. 30 is a sectional view of the optical switch 140 at the cross section showing by the arrow "a" in FIG. 29. As shown in FIG. 30, the mirror 9m functions as a reflecting section that reflects, light outputted from the output ends 6 of the phase difference generating pattern sections 4 of the first and second optical devices 1A and 1B, and light whose constant frequency interval is diffracted by a constant angle difference and light of two polarized light components being orthogonal for each wavelength is diffracted into different angles from each other, and is provided with mirrors 9m-1 to 9m-2n of 2n pieces for individually reflecting the above-mentioned two polarized light components of each of the wavelength components.

That is, the mirrors 9m-1 and 9m-2 can respectively reflect the TE polarized light and the TM polarized light of the same wavelength (wavelength λ1) by angles being different from each other, and the mirrors 9m-3 and 9m-4 can respectively reflect the TE polarized light and the TM polarized light of the wavelength (wavelength λ2) being adjacent to the wavelength reflected by the mirrors 9m-1 and 9m-2 by angles being different from each other. That is, the mirrors 9m-(2i−1) and 9m-(2i) (i=1 to n) can reflect the TE polarized light and the TM polarized light of the same wavelength (λi). Here, in FIG. 30, with respect to light inputted to (or reflected from) the mirrors 9m-1 to 9m-n, the continuous lines show the TE polarized light and the dotted lines show the TM polarized light.

Further, the lens 8 is disposed between the first and second cylindrical lenses 8a-1 and 8a-2 and the mirror 9m (reflecting section), and couples the first and second cylindrical lenses 8a-1 and 8a-2 and the mirror 9m (reflecting section) optically. That is, the lens 8 optically couples the first and second cylindrical lenses 8a-1 and 8a-2 with the mirror 9m (9m-1 to 9m-2n) disposed in one line at the middle height between the first and second cylindrical lenses 8a-1 and 8a-2 in FIG. 29.

And a controlling section 18 can set the angle of each of the mirrors 9m-1 to 9m-2n individually, and by setting the angles of the mirrors 9m-1 to 9m-2n at the controlling section 18, the route of each of the wavelengths and each of the polarized light components of light inputted from the first and second optical circulators 17-1 and 17-2 can be switched over.

Actually, by the control of the controlling section 18, the angle of each of the mirror 9m-1 to 9m-2n can be set in two steps individually such that the angle becomes an angle of continuous lien or an angle of dotted line in FIG. 29.

That is, when the angles of the mirrors 9m-1 to 9m-2n are set to the angle of continuous line in FIG. 29, light outputted from the optical device 1A that was inputted from the input port 17a-1 of the optical circulator 17-1 can be outputted from the output port 17b-2 of the optical circulator 17-2 via the optical device 1B. Likewise, light outputted from the optical device 1B that was inputted from the input port 17a-2 of the optical circulator 17-2 can be outputted from the output port 17b-1 of the optical circulator 17-1 via the optical device 1A.

And when the angles of the mirrors 9m-1 to 9m-2n are set to the angle of dotted line in FIG. 29, light outputted from the optical device 1A that was inputted from the input port 17a-1 of the optical circulator 17-1 can be outputted from the output port 17b-1 of the optical circulator 17-1 via the optical device 1A.

[D-2] Effects

By the above-mentioned structure, at the optical switch 140 according to the fourth embodiment, the angles of the mirrors 9m-1 to 9m-2n are set to the angle of the continuous line or the dotted line in FIG. 29 by the controlling section 18, with this, the output route for the input route can be switched over on request, and a wavelength selecting switch for WDM light can be realized.

At this time, when the mirror 9m is in the state of the continuous line, light outputted from the optical device 1A shown at the upper side in FIG. 29 is reflected at the mirror 9m, and light whose wavelength is different and polarized light is different is multiplexed at the optical device 1B shown at the lower side in FIG. 29, and the multiplexed light is outputted from the output port 17b-2 (OUT#2). When the mirror 9m is in the state of the dotted line (in the state that the mirror 9m slants such that the light returns to the optical device 1A), light outputted from the optical device 1A shown at the upper side in FIG. 29 is reflected at the mirror 9m and is returned to the optical device 1A shown at the upper side in FIG. 29, and light whose wavelength is different and polarized light is different is multiplexed and the multiplexed light is outputted from the output port 17b-1 (OUT#1).

As mentioned above, according to the optical switch 140 of the fourth embodiment of the present invention, by using the optical devices 1A and 1B similar to the optical device 1 at the above-mentioned first embodiment (refer to the reference numeral 1), an effect that can realize a wavelength selecting switch, in which WDM light applied double multiplexing of wavelength multiplexing and polarized wave multiplexing can be switched over to routes at each polarized wave of wavelengths and each wavelength, can be obtained by a simple structure.

[E] Others

The present invention is not to be restricted by the above-mentioned embodiments, and the art of the present invention can change or modify the embodiments without departing from the scope and spirit of the present invention.

For example, as the refractive index difference generating structure of the optical devices 1, 1A, and 1B applying to the polarization monitors 100 and 130 at the above-mentioned second and third embodiments, and the optical switch 140 at the fourth embodiment, at least at the phase difference generating pattern section 4, a part where the refractive indexes of light transmitting through the core 103 are different in the direction parallel to the substrate and in the direction perpendicular to the substrate can be provided. And the part where the refractive indexes of light transmitting through the core 103 is not required to form all of the substrate 101, but is enough to form at least all of the phase difference generating patter section 4.

Furthermore, optical switch 140 of the fourth embodiment is able to be modified to include three or more optical devices similar to that (reference numeral 1) in the first embodiment.

Furthermore, by the disclosure of the above-mentioned embodiments, the devices of the present invention can be manufactured.

What is claimed is:

1. An optical device, in which a clad and a core whose refractive index is relatively higher than that of said clad are formed on a substrate and light is guided in said core to be able to propagate through said core, wherein:
    said core, comprising:
    an input pattern section, including an exposing section in which a core pattern cross section is exposed at one end of said optical device, that is provided with a pattern in which light inputted from said exposing section is able to be transmitted;
    a diffraction pattern section that is formed to connect to said input light transmitting pattern section and has a pattern in which said light from said input pattern section is able to be freely diffracted and becomes divergent; and
    a phase shifting pattern section that is comprised of a plurality of waveguide patterns in which effective optical path lengths are formed different from each other, wherein one end of said a plurality of waveguide patterns are connected to said diffraction pattern section, and said phase shifting pattern section including output end on the other end side opposite to said diffraction pattern section, and said phase shifting pattern section is able to generate phase difference for said light from said diffraction pattern section and output diffracted light beam via said output end, wherein
    at least said phase shifting pattern section comprises a birefringent part where the refractive indexes of light, having a vibration plane of electric field vector parallel to a main plane of said substrate, are different from the refractive indexes of light, having a vibration plane of electric field vector perpendicular to the main plane, wherein
    a boundary section between the side of said phase shift pattern section and said diffraction pattern section is arc shaped, and
    an effective path length difference of said waveguide patterns adjacent to each other is a constant.

2. The optical device according to claim 1, wherein end side of said a plurality of waveguide patterns corresponding to said output end is formed to line in a straight line.

3. The optical device according to claim 2, wherein a region of a predetermined length patterns including said output end in said a plurality of waveguide patterns is configured as a parallel region whose pitch is a constant and is lined in parallel.

4. The optical device according to claim 3, further comprising:
    an output core pattern section that is connected to said parallel region of said phase shifting pattern section, and is formed to have a width wider than the width of said parallel region such that said a plurality of waveguide patterns of which said phase difference generating pattern section is comprised are connected in unification, at one side edge section of said optical device.

5. The optical device according to claim 1, wherein said birefringent part is configured to output each two orthogonally polarized components of a monochromatic light beam via said output end at two different diffraction angles when a plurality of monochromatic light beams having different wavelength are inputted.

6. The optical device according to claim 5, wherein difference of said diffraction angles between said two orthogonally polarized components of a monochromatic light beam is smaller than the difference of said diffraction angles between same polarized components of two monochromatic light beams having the smallest wavelength difference.

7. The optical device according to claim 6, wherein difference of said diffraction angles between said two orthogonally polarized components of a monochromatic light beam is approximately a half of the difference of said diffraction angles between same polarized components of two monochromatic light beams having the smallest wavelength difference.

8. The optical device according to claim 1, wherein said birefringent part includes at least all of said phase difference generating pattern section.

9. A polarization monitor, comprising:
    an optical device, in which a clad and a core whose refractive index is relatively higher than that of said clad are formed on a substrate and light is guided in said core to be able to propagate through said core, wherein: said core, comprising: an input pattern section, including an exposing section in which a core pattern cross section is exposed at one end of said optical device, that is provided with a pattern in which light inputted from said exposing section is able to be transmitted; a diffraction pattern section that is formed to connect to said input light transmitting pattern section and has a pattern in which said light from said input pattern section is able to be freely diffracted and becomes divergent; and a phase shifting pattern section that is comprised of a plurality of waveguide patterns in which effective optical path lengths are formed different from each other, wherein one end of said a plurality of waveguide patterns are connected to said diffraction pattern section, and said phase shifting pattern section including output end on the other end side opposite to said diffraction pattern section, and said phase shifting pattern section is able to generate phase difference for said light from said diffraction pattern section and output diffracted light beam via said output end, wherein at least said phase shifting pattern section comprises a birefringent part where the refractive indexes of light, having a vibration plane of electric field vector parallel to a main plane of said substrate, are different from the refractive indexes of light, having a vibration plane of electric field vector perpendicular to the main plane, wherein a boundary section between the side of said phase shift pattern section and said diffraction pattern section is arc shaped, and an effective path length difference of said waveguide patterns adjacent to each other is a constant;

an optical system for splitting light beams outputted from said optical device into a plurality of light beams in accordance with output angles of said light beams, and focusing each said split light beam at a plurality of focal points different from each other corresponding to said each split light beam; and a photoelectric conversion section of an array shape disposed near said a plurality of focal points of said optical system.

10. The polarization monitor according to claim 9, wherein said optical system comprises a cylindrical lens that collimates the light outputted from said output end of said optical device and diffused to the direction perpendicular to the main plane, and a focusing lens that focuses the light transmitted through said cylindrical lens.

11. The polarization monitor according to claim 9, wherein an end of said waveguide patterns is connected to said diffraction pattern section at one end, and also the other end is formed to line in a straight line as an output end.

12. The polarization monitor according to claim 9, wherein a region of a predetermined length patterns including said output end in said a plurality of waveguide patterns is configured as a parallel region whose pitch is a constant and is lined in parallel.

13. The polarization monitor according to claim 9, further comprising:

an output core pattern section that is connected to said parallel region of said phase shifting pattern section, and is formed to have a width wider than the width of said parallel region such that said a plurality of waveguide patterns of which said phase difference generating pattern section is comprised are connected in unification, at one side edge section of said optical device.

14. The polarization monitor according to claim 9, wherein said refractive index difference generating structure is configured such that diffraction angle difference by which light of the two polarized light components for each wavelength becomes smaller than diffraction angle difference between the diffraction angles of adjacent channel light in wavelength multiplexed light.

15. The polarization monitor according to claim 9, wherein said angle difference by which said light of two polarized light components being orthogonal for each wavelength is approximately a half of angle difference by which light of said constant frequency interval is diffracted.

16. A polarization monitor, comprising:

an optical splitter that is able to split inputted WDM light into first to third split light;

a first analyzer that is able to detect a polarized light component of said first split light;

a first optical monitor that is able to monitor light for each wavelength component of an output from said first analyzer;

a quarter wavelength plate disposed on an optical path of said second split light;

a second analyzer that is able to detect a polarized light component of an output from said quarter wavelength plate;

a second optical monitor that is able to monitor light for each wavelength component of an output from said second analyzer;

a polarization monitor section that has the structure described at claim 9 and is able to monitor two polarized light components being orthogonal of each wavelength component of said third split light; and an operating section that operates a polarization state for each wavelength component from the monitored result at said first and second optical monitors and the monitored result at said polarization monitor.

17. The polarization monitor according to claim 16, wherein said operating section operates Stokes parameter which describes said polarization state.

18. An optical switch, wherein a plurality of optical devices are vertically disposed in parallel, and each of said optical devices is an optical device, in which a clad and a core whose refractive index is relatively higher than that of said clad are formed on a substrate and light is able to be transmitted through said core, and said core comprises an exposing section in which a core pattern cross section is exposed at one end of said optical device, and an input and output light transmitting pattern section that is provided with a pattern in which light inputted and outputted from said exposing section is able to be transmitted, a diffraction pattern section that is formed to connect to said input and output light transmitting pattern section and has a pattern in which said light from said input light transmitting pattern section is able to be freely transmitted by being diffracted and being expanded, and a phase difference generating pattern section that is comprised of a plurality of waveguide patterns in which effective optical path lengths are all different from each other, and is able to generate phase difference for said light from said diffraction pattern section by said a plurality of waveguide patterns, and further comprises a refractive index difference generating structure in which the refractive indexes of light, having a vibration plane of electric field vector parallel to a main plane of said substrate, are different from the refractive indexes of light, having a vibration plane of electric field vector perpendicular to the main plane; wherein in said light outputted from said output end of said phase difference generating pattern section, light of a constant frequency interval is able to be diffracted in an approximately constant angle difference by the phase difference generated by said a plurality of waveguide patterns, and also light of two polarized light components being orthogonal for each wavelength is able to be diffracted by said birefringent part whose refractive indexes of light is different in different angles from each other, and comprises a reflection section that reflects light of two polarized light components being orthogonal for each wavelength and whose constant frequency interval is diffracted by a constant angle difference, outputted from said output end of said phase difference generating pattern section at said first and second optical devices as light diffracted in different angle each other, a plurality of cylindrical lenses that make light outputted from said output end of said phase difference generating pattern section in said a plurality of optical devices approximately parallel, and that collimate the light outputted from said output end and diffused to the direction perpendicular to the main plane, respectively, and a condenser lens, disposed between said a plurality of cylindrical lenses, that optically couples said first and second cylindrical lenses with said reflection section.

* * * * *